United States Patent [19]
Kipp et al.

[11] Patent Number: 6,107,794
[45] Date of Patent: *Aug. 22, 2000

[54] MONITORING SYSTEM FOR DETECTING AXIAL AND RADIAL MOVEMENT OF A ROTATING BODY INDEPENDENT OF ROTATIONAL POSITION

[75] Inventors: Ronald William Kipp, Croydon; Steven Anthony Marinelli, Langhorne; Paul Eugene Vaughn, Lumberville; Wayne Alan Fearn, Warminster, all of Pa.

[73] Assignees: Crane Co., Warrington; Kingsbury, Inc., Philadelphia, both of Pa.

[*] Notice: This patent is subject to a terminal disclaimer.

[21] Appl. No.: 08/941,985

[22] Filed: Oct. 1, 1997

Related U.S. Application Data

[63] Continuation of application No. 08/206,461, Mar. 4, 1994, Pat. No. 5,696,444.

[51] Int. Cl.[7] .............................. G01B 7/14; G01B 7/30; G01D 5/20; G01D 5/12
[52] U.S. Cl. .............................. 324/207.23; 324/207.16; 324/207.22
[58] Field of Search .................. 324/207.23, 207.12, 324/207.16, 207.19, 207.22, 207.25, 207.26, 173, 174; 340/870.31

[56] References Cited

U.S. PATENT DOCUMENTS

| | | |
|---|---|---|
| 2,949,576 | 8/1960 | Bolten . |
| 3,079,548 | 2/1963 | Robinson . |
| 3,307,164 | 2/1967 | Zimmer . |
| 3,748,654 | 7/1973 | Sutherland . |
| 4,717,874 | 1/1988 | Ichikawa et al. . |
| 4,764,767 | 8/1988 | Ichikawa et al. . |
| 4,924,180 | 5/1990 | Nasr et al. . |
| 4,952,874 | 8/1990 | Stadtfeld . |
| 5,006,797 | 4/1991 | Smith . |
| 5,072,181 | 12/1991 | Burger . |
| 5,083,084 | 1/1992 | Bauer et al. . |
| 5,198,763 | 3/1993 | Konishi . |
| 5,448,924 | 9/1995 | Nagai et al. . |

FOREIGN PATENT DOCUMENTS

| | | |
|---|---|---|
| 0169633 | 1/1986 | European Pat. Off. . |
| 2163183 | 7/1973 | France . |
| 2930972 | 2/1981 | Germany . |
| 4215381 | 11/1993 | Germany . |
| 4-42016 | 2/1992 | Japan . |
| 2105475 | 3/1983 | United Kingdom . |
| 9205402 | 4/1992 | WIPO . |

OTHER PUBLICATIONS

European Search Report Application No. EP 95 30 1114; dated Jul. 21, 1997.

*Primary Examiner*—Walter E. Snow
*Attorney, Agent, or Firm*—Renner, Otto, Boisselle & Sklar, LLP

[57] ABSTRACT

A system for sensing a position of a body rotating about an axis, the system including at least one inductive sensor positioned in proximity to the body, each of the at least one inductive sensor providing an output; material forming part of the body for effecting a variation in the output of the at least one inductive sensor as a function of axial movement of the body relative to the axis; circuitry for analyzing the output of the at least one inductive sensor to produce a system output indicative of the axial movement.

33 Claims, 14 Drawing Sheets

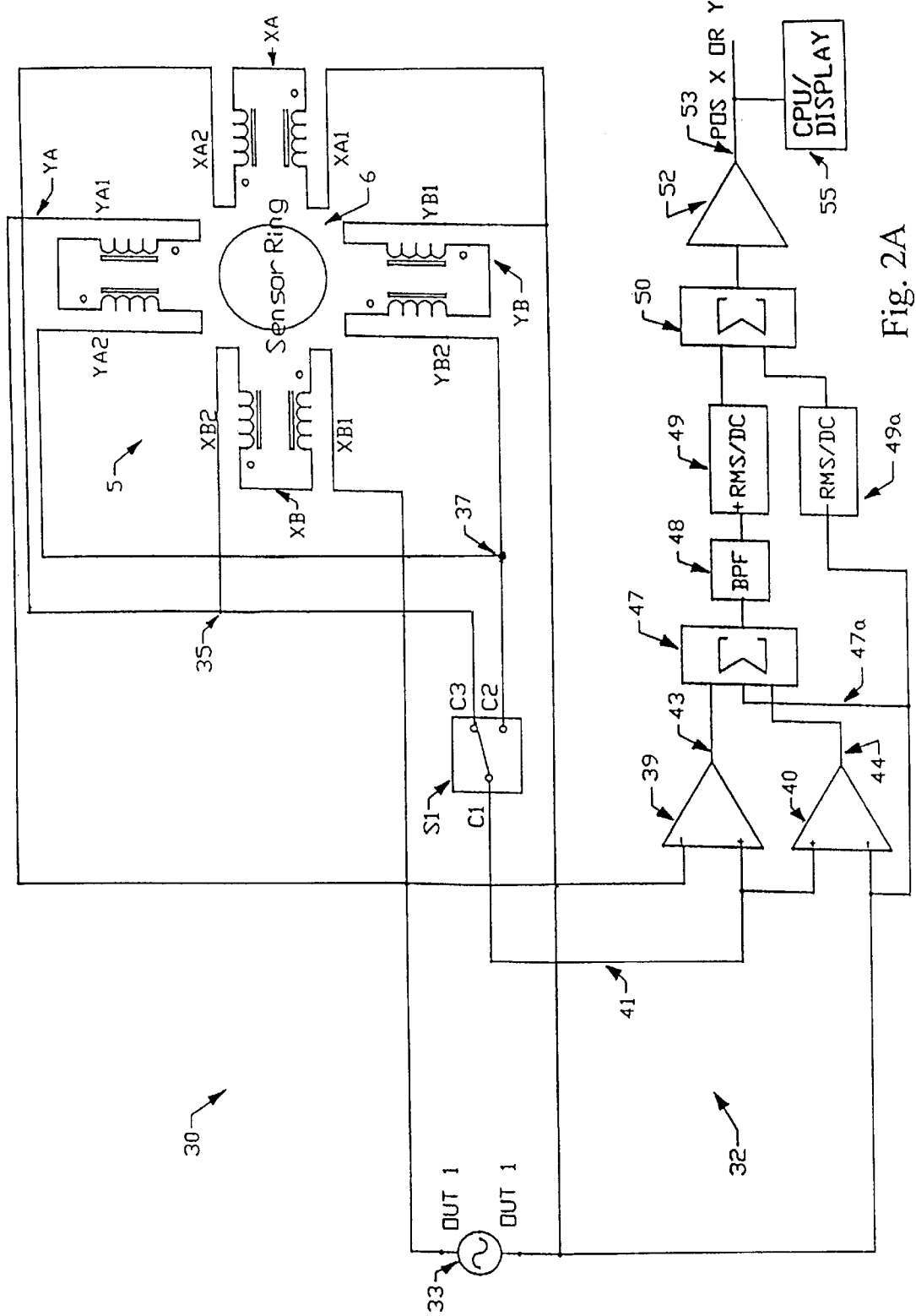

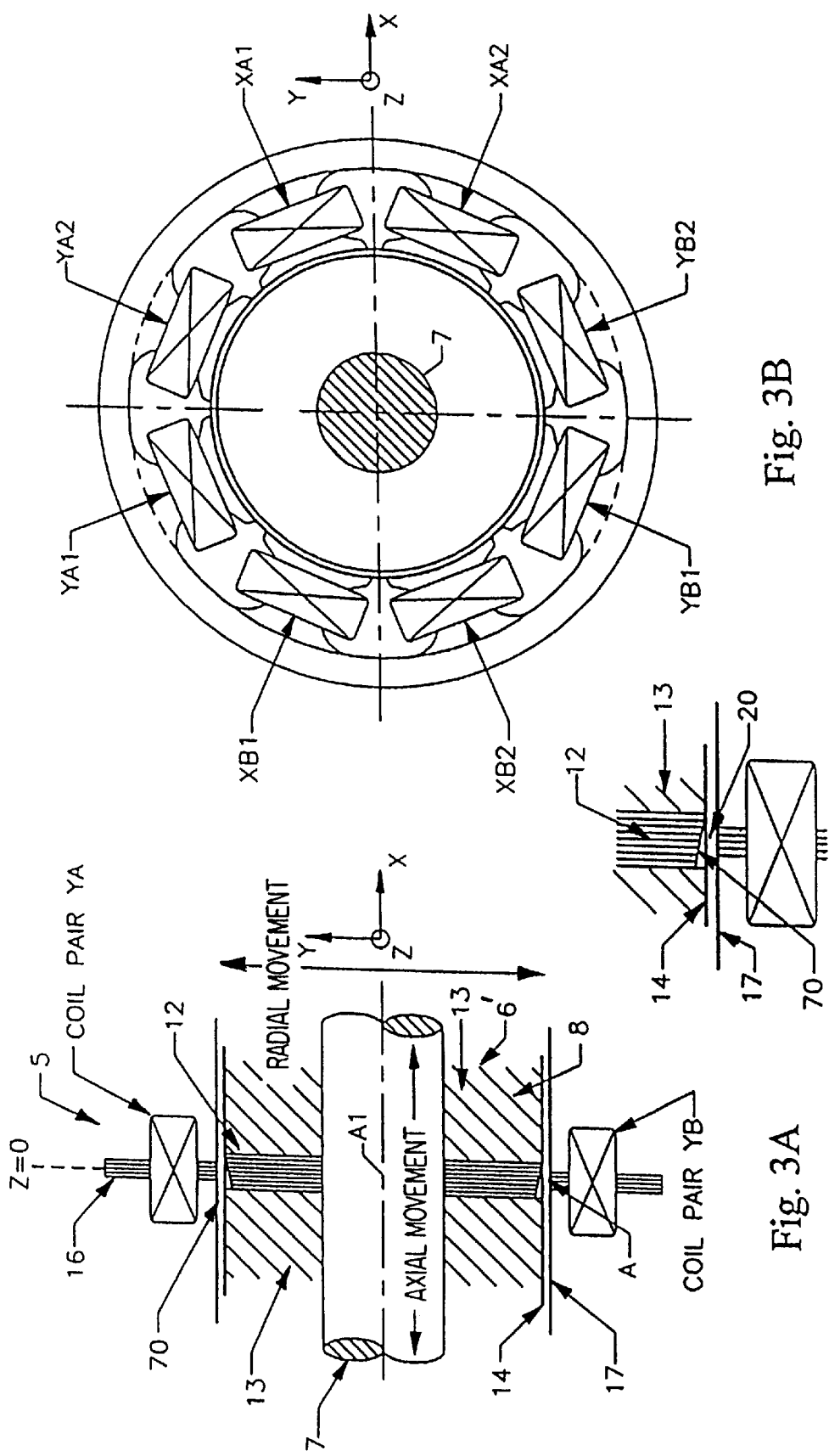

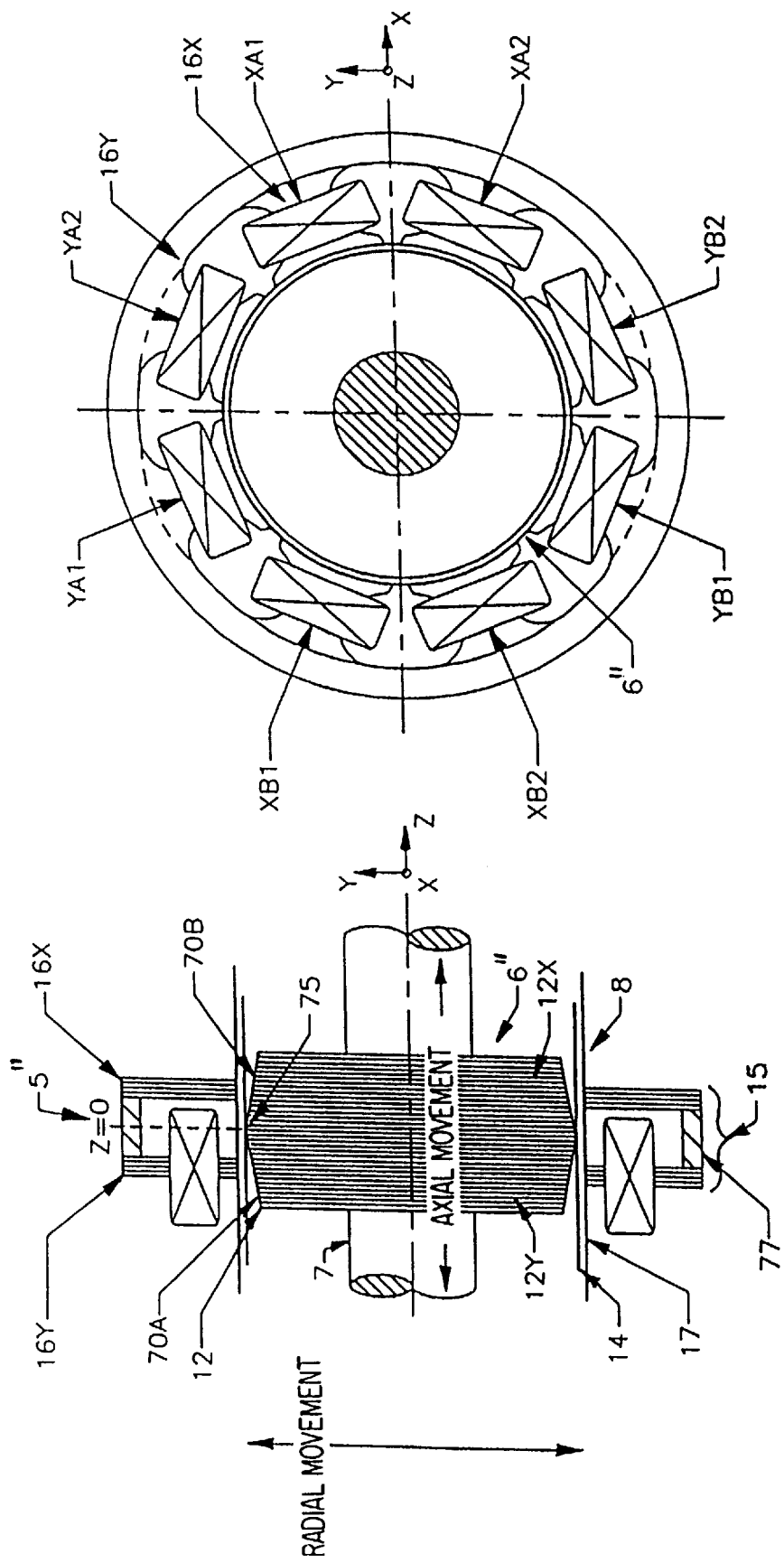

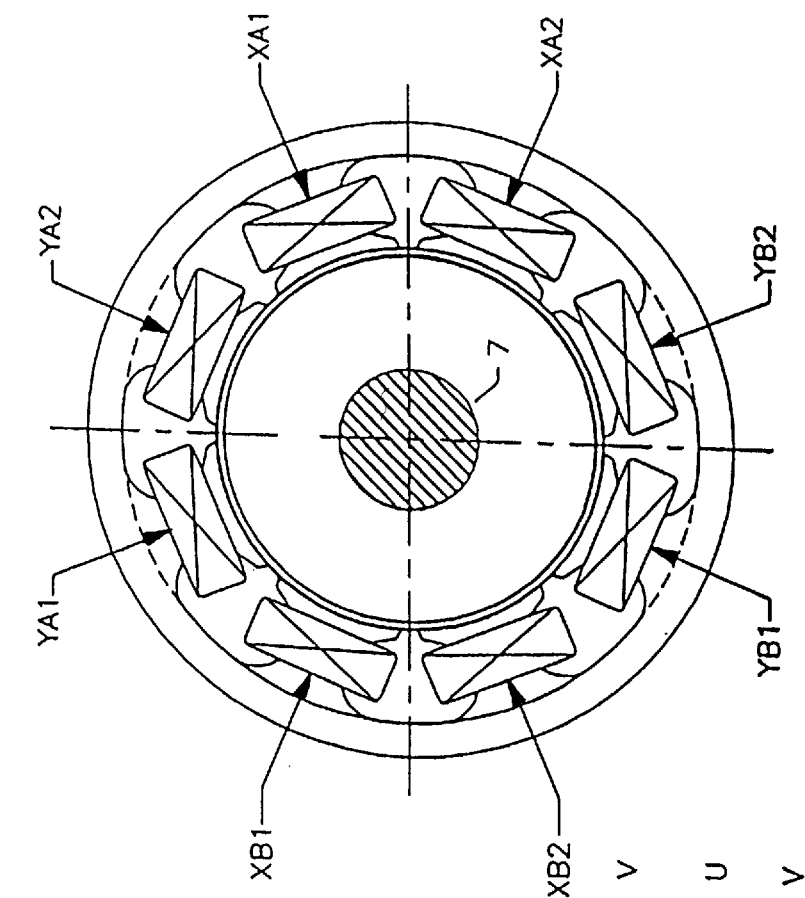
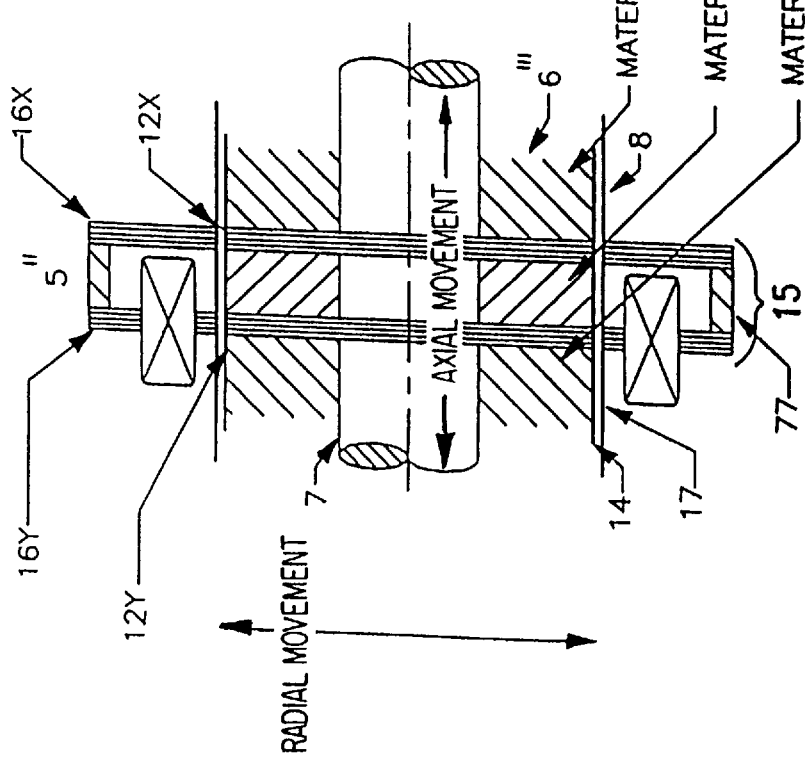
Fig. 6B
Fig. 6A

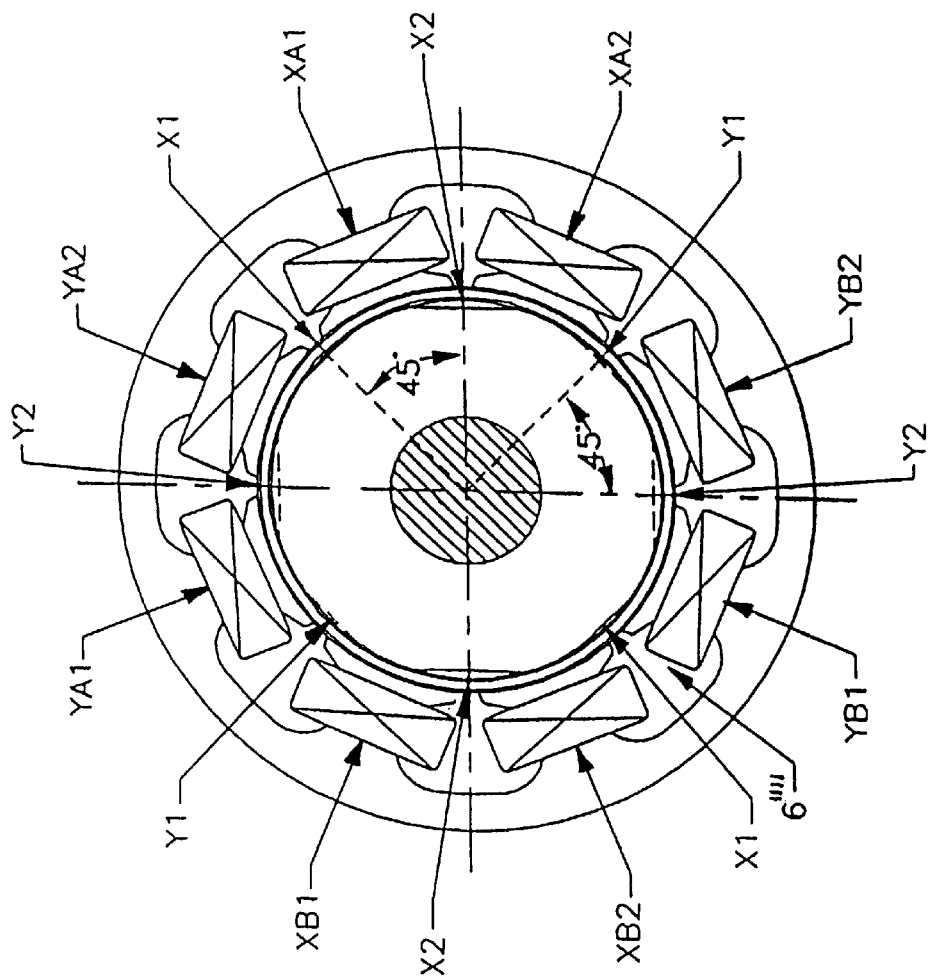
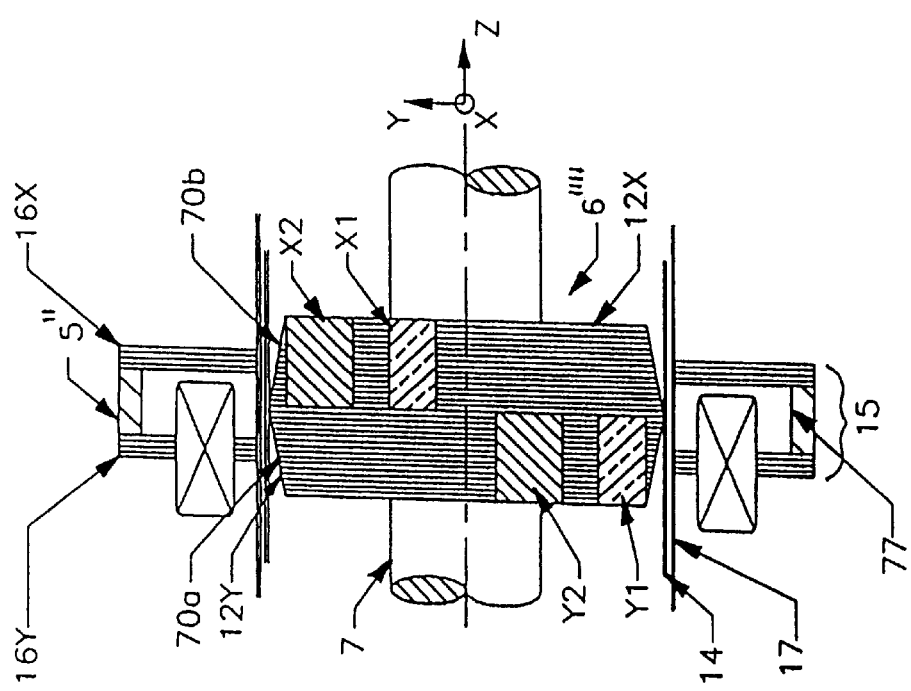
Fig. 7B
Fig. 7A

MONITORING SYSTEM FOR DETECTING AXIAL AND RADIAL MOVEMENT OF A ROTATING BODY INDEPENDENT OF ROTATIONAL POSITION

This application is a continuation of U.S. patent application Ser. No. 08/206,461 filed Mar. 4, 1994, now U.S. Pat. No. 5,696,444.

TECHNICAL FIELD

The present invention relates generally, as is indicated, to a system for detecting axial and radial movement. More particularly, the present invention relates to a high-precision system which detects axial and radial movement of a rotating body in combination with rotational speed and direction.

BACKGROUND OF THE INVENTION

Many types of devices include a body which rotates about an axis. For example, devices such as motors, pumps or the like, include a shaft which rotates.

One specific device is a canned motor pump. The canned motor pump is commonly known and includes a stator and rotor each enclosed in a respective can. As a result of being enclosed, however, the rotor shaft cannot be viewed easily. This makes it difficult to detect bearing wear, shaft movement, shaft rotation, etc. In addition, canned motor pumps typically are designed to be immersed in toxic and/or corrosive liquid for pumping such liquid. Canned motor pumps use a sleeve type bearing to support a coercion resistant shaft, where the process fluid is a lubricant. In this environment, the sleeve bearings wear at rates governed by the lubricity of the fluid being pumped and the amount of particle contaminate contained in the fluid. Therefore, it is of interest to pump users to monitor the condition of the bearings on a continuing basis.

There are many possible methods which potentially could be used on a commercial basis for measuring the physical position of the rotating shaft in a canned motor pump. Those methods can be generally classified as: optical, sonic, capacitance, and eddy current (high frequency inductance) based methods. Nevertheless, each of these methods suffer from inherent limitations. For example, optical and eddy current measurement probes require breaching the pressure containment can with the probe. Moreover, these types of probes would also have to be able to withstand the rigors a very hostile chemical environment, i.e., the process fluid. A fundamental limitation of the capacitance technique is that the process fluid becomes the dielectric of the capacitor, and therefore the characteristics of the process fluid would govern the quality of the measurement. The imprecision of sonic probes when measuring distances in mils (0.001 inch), plus the necessary immersion in the process fluid also eliminates these devices as viable alternatives.

Therefore, the operational criteria for a sensor for measuring the position of the shaft in a canned motor pump is:

1. Capable of resolving shaft position within mils.
2. Unaffected by the process fluid environment.
3. No penetration of the either the stator or rotor cans.

There have been attempts in the past to provide a sensor which meets the above criteria, but such attempts have met with limited success. For example, U.S. Pat. No. 4,924,180 discloses a device for detecting the position of a rotating shaft in a sealed pump. However, the device only detects radial movement of the shaft. The device does not detect axial movement of the shaft. Furthermore, the device does not detect the direction of radial movement or the direction of rotation, each of which can be equally important.

In view of the aforementioned shortcomings associated with existing devices for detecting the position of a rotating shaft, there is a strong need in the art for a system which detects movement of a rotating shaft in both axial and radial directions with high precision. In addition, there is a strong need in the art for a system which detects the direction of the axial and radial movement of the shaft as well as the direction of rotation. Furthermore, there is a strong need in the art for a system which is flexible enough to be used in different environments such as a canned motor pump.

SUMMARY OF THE INVENTION

The present invention relates to a system capable of measuring both radial and axial movement of a rotating body such as a rotor shaft. In addition, The system can measure speed of rotation and direction of rotation. The system is particularly suited for use with a motor pump and allows for canning, and thus protection of the stator and rotor. Such a system is unaffected by the process fluid environment and can provide shaft position, direction and speed information despite the pump being immersed in the fluid.

According to one particular aspect of the invention, a system for sensing a position of a body rotating about an axis is provided, the system including at least one inductive sensor positioned in proximity to the body, each of the at least one inductive sensor providing an output; means forming part of the body for effecting a variation in the output of the at least one inductive sensor as a function of axial movement of the body relative to the axis; and means for analyzing the output of the at least one inductive sensor to produce a system output indicative of the axial movement.

According to another aspect of the present invention, a monitoring system for an electromechanical device including a stator and a rotor which rotates about an axis is provided. The system includes at least one inductive sensor included as part of the stator and positioned in proximity to the rotor, each of the at least one inductive sensor providing an output; means forming part of the rotor for effecting a variation in the output of the at least one inductive sensor as a function of axial movement of the rotor relative to the axis; and means for analyzing the output of the at least one sensor to produce a system output indicative of the axial movement.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 2A is a schematic diagram of a first embodiment of the present invention for detecting radial movement of the rotor assembly;

FIG. 3A is a partial cross-section view of a sensor ring and rotor assembly in accordance with another example of the present invention;

FIG. 3B is a partial plan view of the sensor ring and rotor assembly of FIG. 3A;

FIG. 3C is an enlarged view of the circled section in FIG. 3A;

FIG. 4A is a partial cross-section view of a dual sensor ring and rotor assembly in accordance with yet another example of the present invention;

FIG. 4B is a partial plan view of the dual sensor ring and rotor assembly of FIG. 4A;

FIG. 6A is a partial cross-section view of a dual sensor ring and rotor assembly in accordance with yet another example of the present invention;

FIG. 6B is a partial plan view of the dual sensor ring and rotor assembly of FIG. 6A;

FIG. 7A is a partial cross-section view of a dual sensor ring and rotor assembly having axial flats for detecting speed of rotation and direction of rotation information in accordance with still another example of the present invention;

FIG. 7B is a partial plan view of the dual sensor ring and rotor assembly of FIG. 7A;

FIG. 7C is an enlarged view of the rotor assembly of FIG. 7B;

DESCRIPTION OF THE PREFERRED EMBODIMENTS

The present invention will now be described in detail with reference to the drawings, wherein like elements are referred to with like reference labels throughout.

Figure 1B:
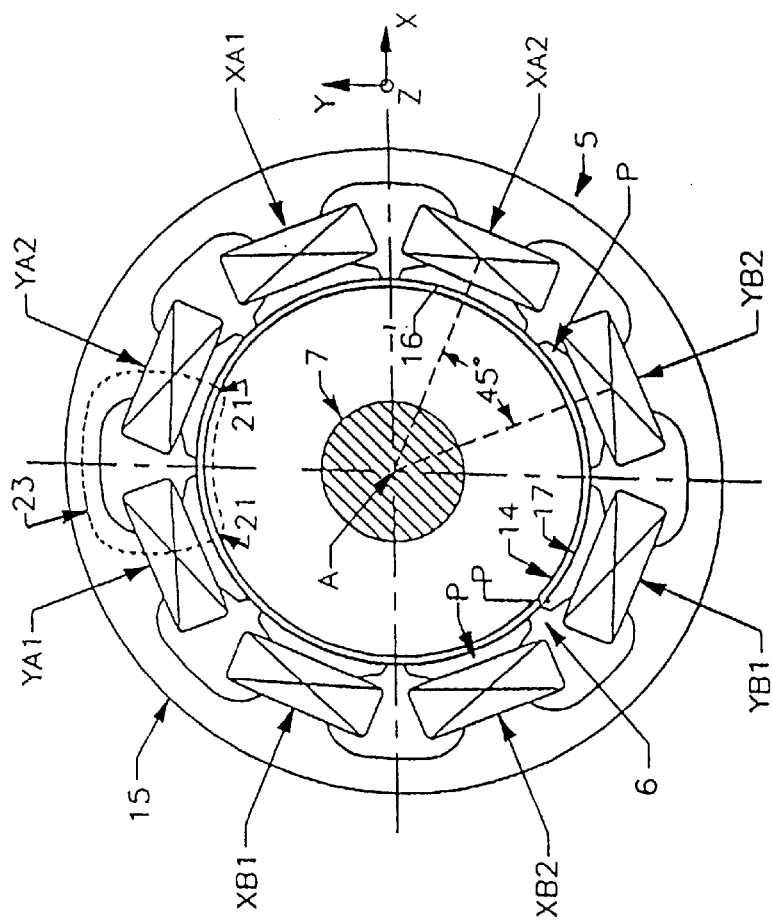
FIG. 1B is a partial plan view of the sensor ring and rotor assembly of FIG. 1A.
Figure 1A:
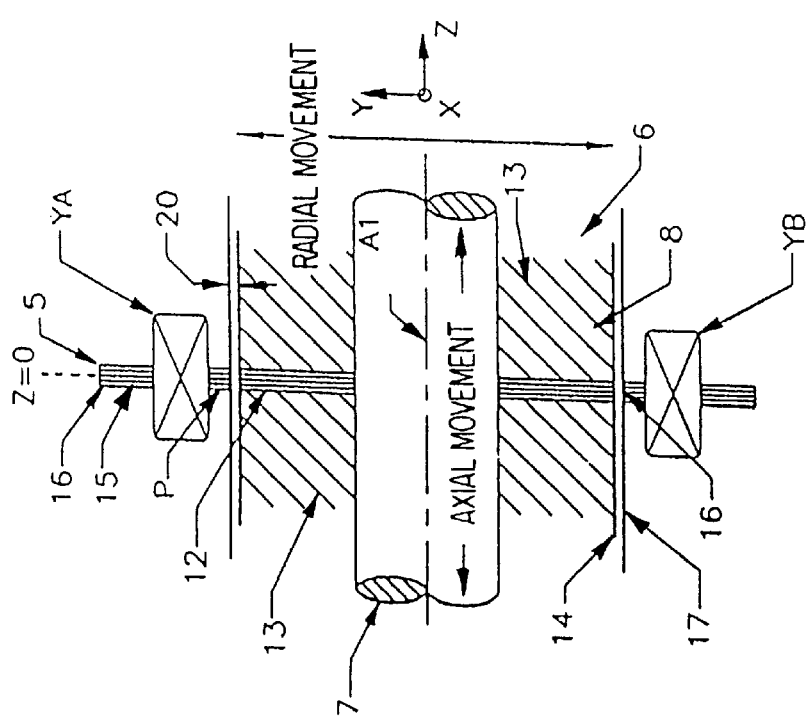
FIG. 1A is a partial cross-section view of a sensor ring and rotor assembly in accordance with one example of the present invention.
Figure 1C:
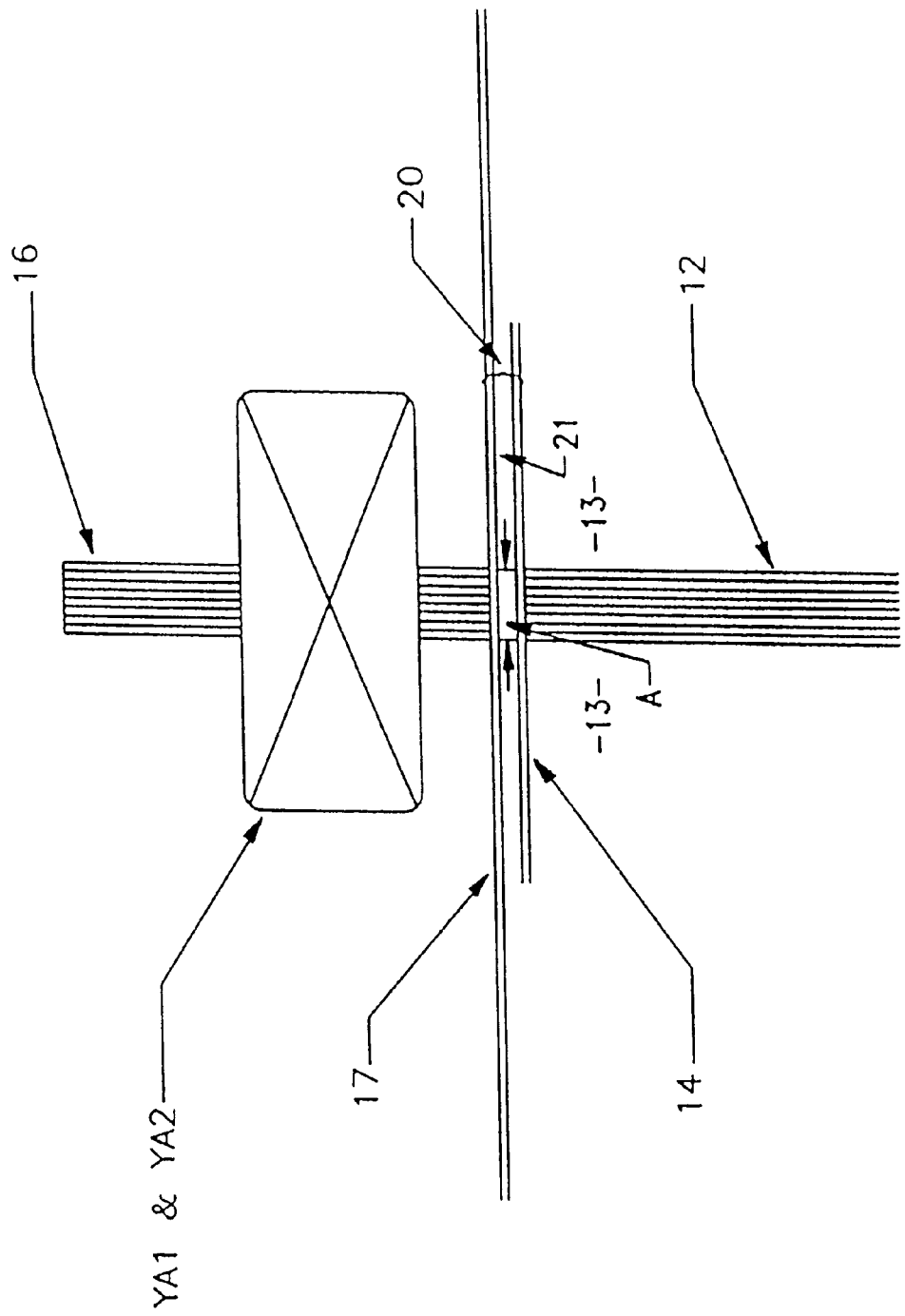
FIG. 1C is an exploded view of the air or fluid gap between the sensor ring and rotor assembly of FIG. 1A.

Referring initially to FIGS. 1A–1C, a first example of an inductive sensor assembly 5 utilized for detecting axial movement of a rotor assembly 6 is shown in accordance with the present invention. The rotor assembly 6 is part of the rotor in an electromechanical device and rotates about an axis A1. The rotor assembly 6 includes a rotor shaft 7 having a cylindrical disc 8 attached thereto. The cylindrical disc 8 includes a stack of rotor laminations 12 made of a material having a relatively high magnetic permeability (e.g., SiFe) sandwiched between non-magnetic material 13 having a relatively low magnetic permeability. The laminations 12 have a circular cross section and are centered relative to the axis A1. The rotor assembly 6 is enclosed in a rotor can 14 made of a non-magnetic material such as stainless steel. Axial movement of the rotor assembly 6 is defined as movement along a Z-axis which is parallel and/or coincident with the axis A1. Radial movement of the rotor assembly 6 is defined as movement normal to the Z-axis along either the X-axis or Y-axis.

The inductive sensor assembly 5 includes a sensor ring 15 secured to the stator assembly (not shown) of the electromechanical device. The sensor ring 15 is formed by of a stack of stator laminations 16 made from a material having a relatively high magnetic permeability (e.g., SiFe). Preferably, the stack of stator laminations 16 is substantially equal in axial length to the stack of rotor laminations 12. The sensor ring 15, as shown in FIG. 1B, is concentrically positioned around the perimeter of the rotor assembly 6 in the X-Y plane, and the stator laminations 16 and rotor laminations 12 preferably are generally aligned relative to the Z-axis as shown in FIG. 1A. The sensor ring 15 includes eight inwardly directed radial legs P. The legs P, as shown in FIG. 1B, are spaced equally at intervals of 45 degrees, and each leg P includes a coil formed around the leg to form an inductive sensor as is explained more fully below. It will be appreciated, however, that any other number of legs P, preferably spaced at equal geometric intervals, can be used in the sensor ring 15. The end 16 of each leg P has a concave shape which follows uniformly the curvature of the rotor assembly 6 and the rotor laminations 12 in particular. In the embodiment of FIG. 1B, the coils are arranged in pairs. Coil pair YA1, YA2 and coil pair YB1, YB2 form the Y-axis coils; and coil pair XA1; XA2 and coil pair XB1, XB2 form the X-axis coils as is discussed more fully below. A stator can 17 encloses the sensor ring 15 relative to the rotor assembly 6 and is also made of a nonmagnetic material such as stainless steel.

The present invention utilizes the inductive sensors formed by the coil pairs in order to determine axial and radial position, speed of rotation, and direction of rotation of the rotor assembly 6 and therefore the shaft 7. To facilitate better understanding of the operation of the present invention, it is useful to consider the following:

The inductance of a closed flux loop inductor, typically referred to as a "iron" or ferrous core inductor, is given by the general inductance equation as:

$$L = N^2/\Re = \text{Inductance in Henrys} \qquad [1]$$

where $$\Re = I_i/\mu_r\mu_o A, \qquad [2]$$

and where
  N=Number of turns of wire around the core
  $\Re$=Reluctance
  $I_i$=Length of the core path
  $\mu_r$=relative permeability of the core material (3500>SiFe>5000)
  $\mu_o$=Permeability of free space (3.191858 ×10$_{-8}$) Henrys/inch
  A=Area across the core.

If a single magnetic gap severs the core path, then the $\Re$ of the core is increased and equation [2] is modified as follows:

$$\Re = I_i(\mu_r\mu_o A) + (g/\mu_o A), \qquad [3]$$

where g=magnetic gap.

The magnetic gap (g) of a severed core is defined as the distance the magnetic flux lines must travel through a poor or non-magnetic material. Good magnetic materials are characterized by having a relatively high $\mu_r$ number (3500>SiFe>5000), and materials that have poor magnetic characteristics, such as brass, aluminum, air, most liquids, and some types of stainless steel, have low $\mu_r$ values, such as 1.

Referring again to FIG. 1A, the space between stator laminations 16 at the end 16' of each leg P and the rotor laminations 12 is regarded as the gap (designated 20). FIG. 1C is an expanded view of the gap 20, and it is shown that the gap 20 refers specifically to the spacing between stator laminations 16 and the rotor laminations 12 and includes the thickness of the stator and rotor cans 17 and 14, respectively. The distance between the stator can 17 and the rotor can 14 forms an air or fluid gap 21.

If two equal gaps 20 sever a core path 23, such as represented in FIG. 1B for the YA coil pair (i.e., coils YA1 and YA2), then the $\Re_{YA}$ of the core is increased and equation [2] is modified as follows:

$$\Re_{YA} = I_i/(\mu_r\mu_o A) + (2g_{YA}/\mu_o A). \quad [4]$$

Substituting equation [4] in equation [1] and solving for the gap $$g_{YA} = (N^2\mu_o A/2L_{YA}) + (I_i/2\mu_r). \quad [5]$$

Thus, knowing the physical parameters $N^2$, $\mu_o$, A, $I_i$, $\mu_r$, and being able to measure or deduce the inductance (L), the distance (g) of gap 20 can be inferred. This is the operating principle behind the present invention, where N relates to the number of turns in the coils YA1, YA2, YB1, etc.; A is the area of overlap between the core formed by the sensor ring 15 and the rotor laminations 12; and $I_i$ is the length of the core path through the sensor ring 15, e.g., path 23.

Again referring to FIGS. 1A–1C, the coil legs P are positioned such that the angle between the coils in the respective coil pairs XA, XB and YA, YB bisects the X-axis and the Y-axis, respectively. If the rotor assembly 6 is centered within the sensor ring 15 (and thus, centered within the stator), the corresponding gaps 20 will be equal and the inductance values for the XA, XB, YA and YB coil pairs will be equal (assuming all of the physical parameters previously described are also equal). As the rotor assembly 6 is moved off of the center position, for example in the –X direction, then the corresponding gaps 20 for the XA and XB coil pairs will change and as a result the inductance of the XB coil pair will increase while the XA coil pair inductance will diminish. In the same manner, the position of the rotor assembly 6 anywhere within the Cartesian coordinate system (X,Y) can be determined by examination of the inductance values of the coil pairs as is described further below.

A careful examination of equation [5] above and close inspection of FIGS. 1A–1C should indicate to the astute observer that the volume within the gap 20 does not change linearly as the rotor is moved in one direction, such as the +X direction. This is due, of course, to the integration of the volume between the curves of two non-concentric circles. However, it can be shown that for the sensor ring 15 geometry shown and equivalents thereof, standard radial movements can be approximately linearized by comparing the inductance of complementary coil pairs, such as $L_{XA}$ to $L_{XB}$, where $L_{XA}$ is the total inductance of coils XA1 and XA2, and $L_{XB}$ is the total inductance of coils XB1 and XB2.

FIG. 2A is an example of a system for monitoring the movement or position of the rotor assembly 6 by comparing the inductance of complementary coil pairs. Specifically, FIG. 2A is a schematic representation of a monitoring system 30 which includes the sensor assembly 5 and rotor assembly 6 configured as shown in FIGS. 1A–1C. The system 30 also includes an analyzing circuit 32 which analyzes the voltage across the various coil pairs, the voltage across the coil pairs being representative of the inductance thereof as will be appreciated.

The analyzing circuit 32 includes an AC power source 33 which provides an oscillating voltage signal across its output terminals OUT1 and OUT2. The power source 33 preferably outputs a sinusoidal output voltage having a frequency in the range of 1 kilohertz to 100 kilohertz, although other waveforms and frequencies could be utilized depending, for example, on the size of the coils etc., without departing from the scope of the invention.

Coils XB1 and XB2 are connected in series to form coil pair XB having an inductance $L_{XB}$, and coils XA1 and XA2 are connected in series to form coil pair XA having an inductance $L_{XA}$. Similarly, coils YA1 and YA2 are connected in series to form coil pair YA having an inductance $L_{YA}$, and coils YB1 and YB2 are connected in series to form coil pair YB having an inductance $L_{YB}$. The polarities of the respective coils are as shown. Coil pair XB is connected in series with coil pair XA at node 35. The other terminal of coil pair XB is connected to output terminal OUT1 of power source 33, and the other terminal of coil pair XA is connected to output terminal OUT2. As a result, the series connected coil pairs XB and XA form an X-axis voltage-divider across output terminals OUT1 and OUT2. An X-axis voltage-divider output is provided at node 35.

In a similar manner, coil pair YA is connected in series with coil pair YB at node 37. The other terminal of coil pair YA is connected to the output terminal OUT1 of power source 33, and the remaining terminal of coil pair YB is connected to output terminal OUT2. As a result, the series connected coil pairs YA and YB form a Y-axis voltage-divider across output terminals OUT1 and OUT2. A Y-axis voltage-divider output is provided at node 37. A switch S1 operates to couple selectively either the X-axis output at node 35 or the Y-axis output at node 37 to the non-inverting inputs of operational amplifiers 39 and 40 (via line 41). The inverting input of operational amplifier 39 is connected to output terminal OUT1 of power source 33. The inverting input of operational amplifier 40 is connected to output terminal OUT2 of power source 33.

As a result, the output of operational amplifier 39 on line 43 represents the voltage across coil pair XB or YA, depending on the position of switch S1. The output of operational amplifier 40 on line 44, on the other hand, represents the voltage across coil pair XA or YB, depending on the position of switch S1. Because the output terminals OUT1 and OUT2 are 180 degrees out of phase, however, it will be appreciated that outputs from the operational amplifiers 39 and 40 will be opposite in polarity.

In order to measure radial position of the rotor assembly 6 relative to the X-axis, switch S1 is placed in the position shown in FIG. 2A. Assuming the rotor assembly 6 were centered within the sensor ring 15 (i.e., X=0), the inductance values of coil pairs XA and XB would be equal and thus the voltage drop thereacross would also be equal. In such case, the output signals on lines 43 and 44 would be equal in magnitude, although opposite in polarity. The signals on lines 43 and 44 are added together by analog summing circuit 47 in combination with a voltage reference provided from the OUT2 terminal via line 47a. The output from the summing circuit 47 is passed through a bandpass filter 48, a positive (+) RMS-to-DC voltage converter 49 which detects the average DC voltage from the bandpass filter 48. The output from the RMS-DC converter 49 is added together with the output from a second RMS-DC converter 49a which provides a negative (−) RMS to DC reference voltage based on the output from terminal OUT2, by a second analog summing circuit 50. The output of the analog summing circuit 50 is provided as the input to an amplifier 52 to produce a DC output signal on line 53. The value of the output signal on line 53 is indicative of the difference in voltage/inductance between the coil pairs XA and XB, and therefore is indicative of the X-axis radial position of the rotor assembly 6 for the reasons stated above.

When the rotor assembly 6 is centered, the output of the summer circuit 50 is zero assuming again that each of the coils are identical. As the rotor assembly 6 moves off the center position (X=0) such as in the +X direction, for example, the inductance of coil pair XA increases as the inductance of coil pair XB decreases. As a result, the output of the summing circuit 50 becomes positive and its particular value is substantially linearly related to the position of the rotor assembly 6 in the +X direction. On the other hand, if the rotor assembly 6 moves off the center position in the −X direction, the inductance of coil pair XA decreases as the inductance of coil pair XB increases. As a result, the output of the summing circuit 50 becomes negative and its particular value is linearly related to the position of the rotor assembly in the −X direction. In either case, the output of the summing circuit 50 is filtered to produce a DC output signal on line 53.

The signal on line 53 can be further processed by a computer and/or display 55, etc. The output signal on line 53 can be used to provide a quantitative measure of the radial position in the X direction, and/or to provide automated control as part of a larger system. As a result, the monitoring system 30 is capable of monitoring bearing wear or other conditions which cause movement in a radial direction.

In order to monitor radial movement in the Y-axis direction, switch S1 is positioned so as to couple the Y-axis voltage-divider output at node 37 to line 41. In such case, the operation of the monitoring system 30 is analogous to that described above for detecting radial movement in the X-axis direction, with the exception that the relative inductance values of the YA and YB coil pairs are compared to determine position on the Y-axis. As a result, further detail is omitted.

The axial position of the rotor assembly 6 could be ascertained in a modified embodiment by placing complementary coil pairs (ZA and ZB) (not shown) on either side of the rotor laminations 12 with respect to the Z-axis. However, a feature of the present invention is that axial position can be ascertained using the same sensor ring 15 which is used to determine radial position. Such a design results in lower overall circuit complexity and cost.

For example, referring again to FIG. 1A, axial movement of the rotor shaft 7 and rotor assembly 6 will result in a variation of the total inductance of the coil pairs as the rotor assembly 6 moves axially relative to the sensor assembly 5. The total inductance of the coil pairs can be represented by $L_{XT}$ AND $L_{YT}$, where $L_{XT}=L_{XA}+L_{XB}$, and $L_{YT}=L_{YA}+L_{YB}$, $L_{XT}$ & $L_{YT}$ are governed by the area of overlap A (FIG. 1C) between the sensor ring stator laminations 16 and the rotor laminations 12. Therefore, if the axial length of the rotor laminations 12 and stator laminations 16 is the same, then $L_{XT}$ and $L_{YT}$ are maximum when the rotor and stator laminations are axially aligned. Movement along the Z axis, on the other hand, effects a change in the value of $L_{XT}$ and $L_{YT}$ as governed by [5]. For example, axially positioning the center of the stack of rotor laminations 12 at either edge of the stack of stator laminations 16 would substantially reduce $L_{XT}$ and $L_{YT}$ by one half [$A_{new}=A_{max}/2$].

Figure 2B:
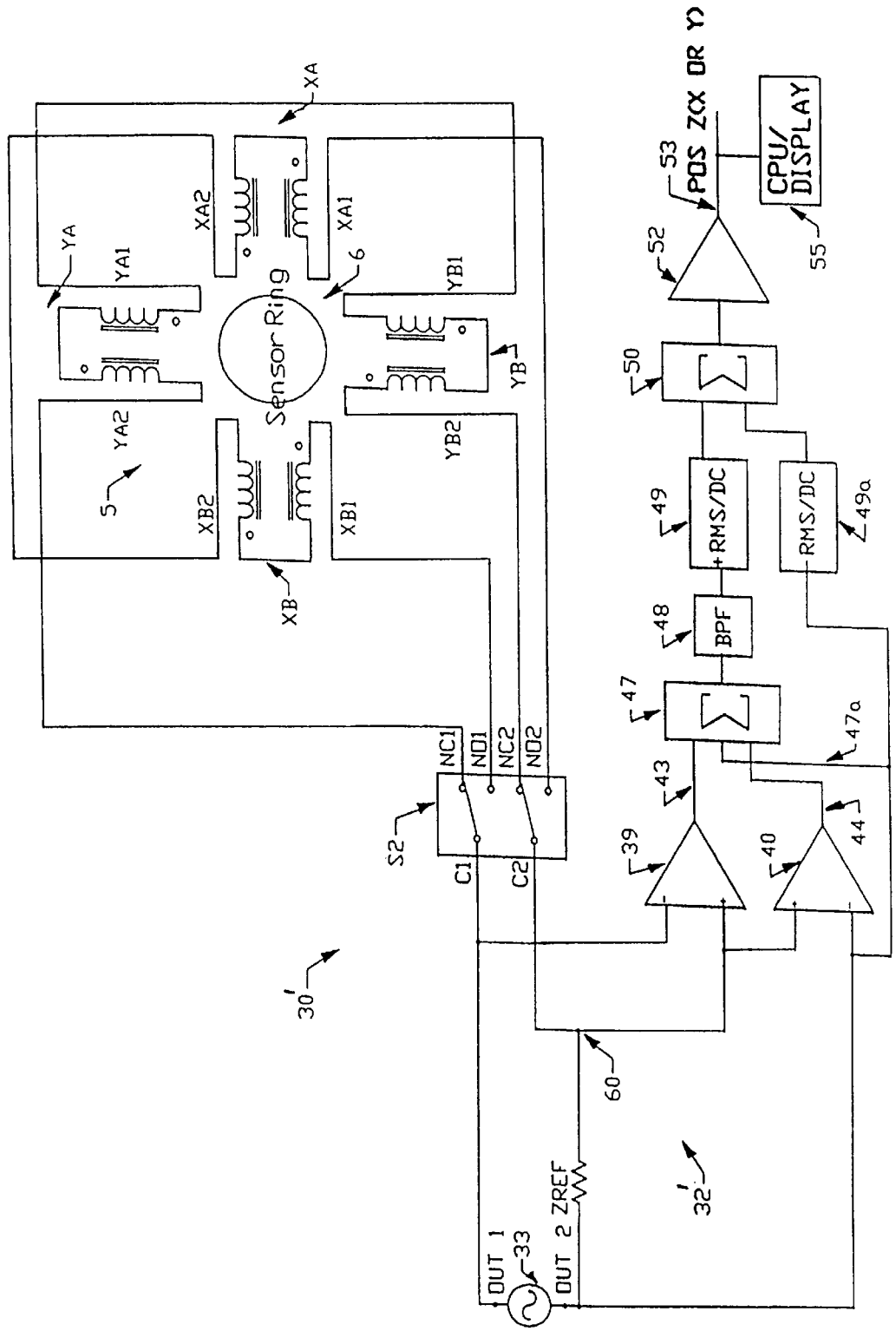
FIG. 2B is a schematic diagram of a second embodiment of the present invention for detecting both radial and axial movement of the rotor assembly.

FIG. 28 is a schematic diagram of another embodiment of the monitoring system (designated 30') for detecting the axial position of the rotor assembly 6. The monitoring system 30' includes the sensor assembly 5 and rotor assembly 6 configured as shown in FIGS. 1A–1C. The system 30' also includes an analyzing circuit 32' which analyzes the voltage across the various coil pairs, the voltage across the coil pairs representing the inductance thereof as will be appreciated. In the embodiment of FIG. 2B, coils YA2, YA1, YB1 and YB2 are connected in series across terminals NC1 and NC2 of switch S2. Coils XB1, XB2, XA2 and XA1 are connected in series across terminals NO1 and NO2 of switch S2.

When switch S2 is in the position shown, series connected coils YA2, YA1, YB1 and YB2 present the total inductance $L_{YT}$ connected in series with reference impedance Zref to form a voltage divider across output terminals OUT1 and OUT2 of the power source 33. Node 60 represents the output of the voltage divider and is connected to the non-inverting input of both operational amplifiers 39 and 40. As a result, the output of operational amplifier 39 on line 43 represents the voltage across all of the Y coils and the output of operational amplifier 40 on line 44 represents the voltage across impedance Zref.

Zref is an impedance (either reactive or resistive) that has been selected such that the impedance of $L_{XT}$ and the impedance of $L_{YT}$ has a known relationship to Zref, e.g. ZRef=$XL_{XT}=XL_{YT}$ when the rotor assembly 6 and stator assembly 5 are aligned. It is noted that $XL_{YT}=2\pi FL_{YT}$, for example, and F is the frequency of the source 33. When rotor assembly 6 moves axially relative to the sensor assembly 5 in the positive or negative direction, the total impedance $L_{YT}$ will decrease and the voltage across impedance Zref will increase as a result. The summing circuit 47 adds the outputs from the operational amplifiers 39 and 40 together with the voltage reference provided on line 47a, and the output of the summing circuit 47 is filtered through the bandpass filter 48. The average DC voltage from the bandpass filter 48 is provided by the converter 49, and the resulting signal is added to the negative RMS-DC reference voltage from the converter 49a by the summing circuit 50. Again, the output of the summing circuit 50 is coupled through amplifier 52 to produce the output signal on line 53. As a result, when the rotor assembly 6 moves in the axial direction, the output on line 53 varies substantially linearly as a function of the distance of axial movement. Again, the output on line 53 can be processed by a CPU and/or display 55 to provide control and/or display information. It will be appreciated, however, the direction of axial movement remains unresolved.

Axial movement can also be detected based on the X coils by changing switch S2 to the position shown in phantom whereby series connected coils XB1, XB2, XA2 and XA1 present a total inductance $L_{XT}$ connected in series with reference impedance Zref to form a voltage divider across output terminals OUT1 and OUT2 of the power source 33. Operation of the system 30' is similar to that described above with respect to the Y coils except using the X coils, and therefore further detail is omitted.

It will be appreciated by those having ordinary skill in the art that the circuits of FIGS. 2A and 2B can be combined using known switching techniques such that both radial and axial movement can be detected using the very same sensor assembly 5 and rotor assembly 6. Such a combination is considered to be within the scope of the invention.

FIGS. 3A and 3B depict the sensor assembly 5 of FIGS. 1A–1C and an alternate embodiment of the rotor assembly (designated 6'). The rotor assembly 6' is identical to the rotor assembly in FIGS. 1A–1C with the following exceptions. The stack of rotor laminations 12 has an axial length sufficiently longer than the axial length of the stack of stator windings 16 such that the rotor laminations 12 will always be within the influence of the stator laminations 16 throughout the expected range of axial movement. Therefore, the effective area A will remain constant. The outside diameter (OD) of the stack of rotor laminations 12 is modified also to include a linear taper 70 as shown in FIGS. 3A and 3C. The purpose of the taper 70 is to produce an effective gap change ($\Delta g_z$) in the gap 20 for both $L_{XT}$ and $L_{YT}$ as the rotor assembly 6' moves axially as will be described below.

Using the system 30' shown in FIG. 2B with the exception that the rotor assembly 6' of FIGS. 3A–3C is substituted in place of the rotor assembly 6 of FIGS. 1A–1C, the distance and direction of axial movement can be detected. For example, if impedance Zref is selected to equal the impedance presented by the total inductance $L_{YT}$ of the Y coils and/or the total inductance $L_{XT}$ of the X coils when the rotor assembly 6' is centered (i.e., Z=0), then the direction of axial movement can be electronically represented by a signed (– or +) relationship at the output on line 53.

For example, using the Y coils to determine axial movement whereby switch S2 in the position shown in FIG. 2B, when the rotor assembly 6' is centered at Z=0, the impedance Zref is selected to be equal to the impedance presented by the total inductance $L_{YT}$. As a result, the output of the summing circuit 50 will be zero as will be the output from the amplifier 52. If the rotor assembly 6' moves to the left as viewed in FIG. 3A, the effective gap 20 between the stator laminations 16 and the rotor laminations 12 will decrease due to the taper 70, thereby increasing the inductance $L_{YT}$. As a result, the voltage across the total inductance $L_{YT}$ will be greater than the voltage across the impedance Zref. Thus, the output from the amplifier 52 will become positive.

Furthermore, it will be appreciated that the rotor assembly 6' with taper 70 can be utilized with the system 30 shown in FIG. 2A in place of the rotor assembly 6. The taper 70 has a uniform effect on the coil pairs with respect to radial movement. As a result, the rotor assembly 6' is effective for detecting both radial and axial movement, and the signed (+/–) direction of such movement.

FIGS. 4A and 4B represent still another embodiment of the sensor assembly and rotor assembly, designated 5" and 6", respectfully. In this embodiment, the single taper 70 discussed in connection with FIGS. 3A–3C has been replaced by a complementary pair of tapers 70a and 70b. Specifically, the stack of rotor laminations 12 includes stacks 12Y and 12X having respective tapers 70a and 70b. The tapers 70a and 70b are positioned such that the apex 75 thereof is approximately centered between two separate stator lamination stacks 16Y and 16X, respectively. A spacer 77 made of a non-magnetic material is selected so that the maximum axial movement of the rotor assembly 6" relative to the stator assembly 5" is less than the axial dimension of the spacer 77. The stator lamination stack 16Y includes the YA1, YA2, YB1 and YB2 coils, and the stator lamination stack 16X includes the XA1, XA2, XB1 and XB2 coils positioned as shown in FIG. 4B. The coils on stator lamination stack 16Y are affected by the rotor laminations in stack 12Y, whereas the coils on stator lamination stack 16X are affected by the rotor laminations in stack 12X. Because the tapers 70a and 70b are complementary, movement of the rotor assembly 6" will result in an effective gap change of $\Delta g_z$ between lamination stack 12X relative to the lamination stack 16Y and an effective gap change of $-(\Delta g_z)$ relative to the lamination stack 16X.

An advantage of the embodiment of FIGS. 4A and 4B over the embodiment of FIGS. 3A–3C is the provision of additional common mode noise cancellation. With the system 30' of FIG. 2B using the rotor assembly 6' of FIGS. 3A–3C, the comparison of Zref, which is a constant, to a varying $L_{XT}$ or $L_{YT}$ inductance will limit the removal of any common mode noise induced in $L_{XT}$ or $L_{YT}$. Additionally, even though the theoretical effective gap change ($\Delta g_z$) is a linear quantity, in reality the gap seen by the inductive flux lines for a tapered surface is a non-linear quantity that varies exponentially as the axial distance is changed linearly. Theoretically, this effect can be related to the bending and bunching of the inductive core flux lines as they emit from the stator to the closest rotor laminate material, thus making a linear axial movement into a non-linear inductance change. Nevertheless, a non-linear electronic device, such as square law multiplier, could replace the standard linear amplifier 52 in FIG. 2B, or a computer algorithm on the CPU 55 could be used to linearize the output signal on line 53.

According to the embodiment of FIGS. 4A and 4B, however, the complementary tapers 70a and 70b are introduced to reduce common mode noise, to reduce the non-linear axial changes in inductance, and to increase the sensitivity of the system. By comparing two approximately equal, but inverse, non-linear inductive relationships, a near linear correlation can be established for axial position, by examining the resultant changes of $L_{XT}$ and $L_{YT}$.

Figure 5A:
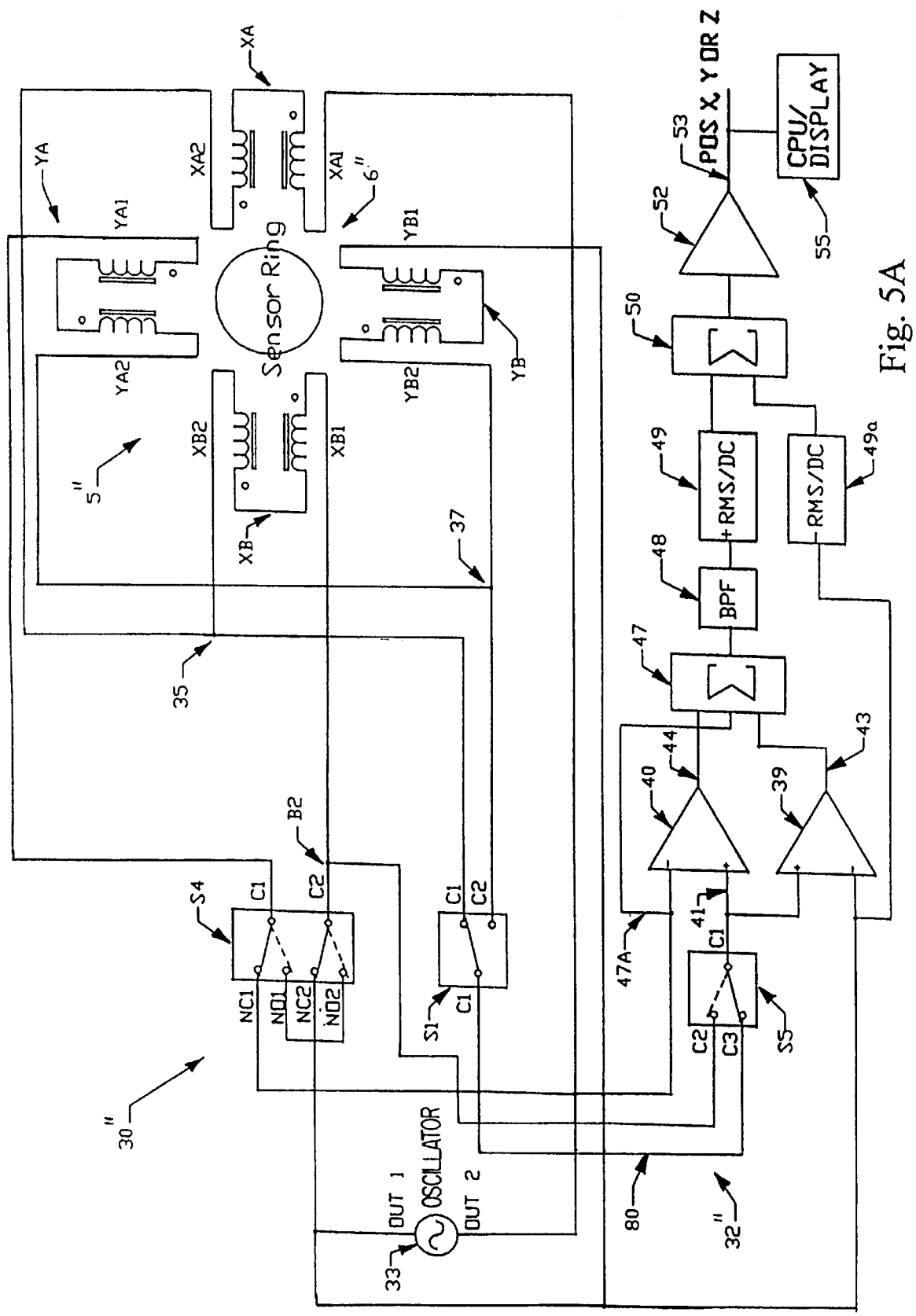
FIGS. 5A and 5B provide a schematic diagram of a third embodiment of the present invention for detecting radial and axial movement of the rotor assembly using common mode noise reduction, and for detecting speed of rotation and direction of rotation.

FIG. 5A is a schematic diagram of an embodiment of the monitoring system (designated 30") which uses the stator assembly 5" and rotor assembly 6" of FIGS. 4A and 4B. In the system 30", the comparison of $L_{XT}$ to $L_{YT}$ provides axial position information while also providing for common noise cancellation and common environmental conditions for the coil pairs as will be discussed below. In addition, the comparison of the inductances of the respective coil pairs XA, XB, YA, and YB provides radial position information in much the same manner as discussed above with respect to FIG. 2A.

For example, in FIG. 5A coils XB1 and XB2 are connected in series to form a coil pair XB, and coils XA1 and XA2 are connected in series to form a coil pair XA similar to FIG. 2A. In the same manner, coils YA1 and YA2 are connected in series to form coil pair YA, and coils YB1 and YB2 are connected in series to form coil pair YB. Coil pair XB is connected in series with coil pair XA at node 35. The other terminal of coil pair XB is connected to contact C2 of switch S4 and to contact C2 of switch S5. The other terminal of coil pair XA is connected to output terminal OUT2. As a result, when contact C2 of switch S4 is connected to contact NC2 the series connected coil pairs XB and XA again form an X-axis voltage-divider across output terminals OUT1, OUT2, with an X-axis voltage-divider output provided at node 35.

Similarly, coil pair YA is connected in series with coil pair YB at node 37. The other terminal of coil pair YA is connected to contact C1 of switch S4, and the other terminal of coil pair YB is connected to output terminal OUT1 of the power source 33. As a result, when contact C1 of switch S4 is connected to contact NC1, the series connected coil pairs YA and YB form a Y-axis voltage-divider across output terminals OUT1 and OUT2 of the power source 33. A Y-axis voltage-divider output is provided at node 37. Switch S1 selectively couples either the X-axis output at node 35 or the Y-axis output at node 37 to contact C3 of switch S5 via line 80. Contact C1 of switch S5 is connected to the noninverting input of operational amplifiers 39 and 40 via line 41.

The inverting input of operational amplifier 39 is connected to output terminal OUT1 of power source 33. Similarly, the inverting input of operational amplifier 40 is connected to output terminal OUT2 of power source 33. In order to measure radial position of the rotor assembly, switch S4 is placed in the position shown whereby contacts C1 and C2 are connected to contacts NC1 and NC2, respectively. Switch S5 is placed in the position shown whereby contact C1 is connected to contact C3. With switch S1 in the position shown such that contact C3 is connected to contact C1, the system 30" operates similar to that described above in connection with FIG. 2A. In particular, node 35 is connected to line 41 and the operational amplifiers 39 and 40 detect the voltages across the coil pairs XB and XA, respectively. The summing circuits 47 and 50 add the outputs of the operational amplifiers 39 and 40 in the same manner described above to produce an output signal on line 53 which is substantially linearly related to the radial position of the rotor assembly 6" relative to the X-axis. By simply changing the position of switch S1 so that contact C1 is connected to contact C2 and node 37 is connected to line 41, the system 30" will provide an output on line 53 which varies substantially linearly with the radial position of the rotor assembly 6" relative to the Y-axis.

In order to measure axial movement of the rotor assembly 6" in system 30", switch S5 is positioned such that contact C1 is connected to contact C2 as shown in phantom. In addition, switch S4 is positioned such that contacts C1 and C2 are connected to contacts NO1 and NO2, respectively, as shown in phantom. Contacts NO1 and NO2 are wired together and, as a result, coil pairs YA and YB are connected in series between output terminal OUT1 of the power source 33 and node 82. Moreover, coil pairs XA and XB are connected in series between node 82 and output terminal OUT2 of the power source 33.

As a result, the output of operational amplifier 39 represents the voltage across coil pairs YA and YB, and the output of operational amplifier 40 represents the voltage across coil pairs XA and XB. Due to the complementary tapers 70a and 70b, axial movement of the rotor assembly 6" will result in equal but opposite changes in the effective gaps with respect to the stator lamination stacks 16Y and 16X. This will result in an equal but opposite change in the voltage across the respective groups of coil pairs. Accordingly, when the outputs of amplifiers 39 and 40 are added by the summing circuit 47, the output of the summing circuit 47 will represent an accumulation of the change in voltage in the XA, XB and YA, YB coils due to the complementary tapers. On the other hand, any common mode noise introduced in the XA and XB coil pairs will be cancelled out by common mode noise introduced in the YA and YB coil pairs. The resultant output on line 53 will vary substantially linearly with the axial position of the rotor assembly 6" as will be appreciated. The direction of axial movement can be ascertained on the basis of whether the output on line 53 increases or decreases as will be appreciated.

It will also be appreciated that linear tapers 70a, 70b have been used for sake of example, but that other shapes such as a stepped shape, compound curves, V-shape, U-shape, etc., can be used for the tapers. The tapers can also be enhanced by using different materials with different magnetic permeability properties as is discussed below.

Figure 5B:
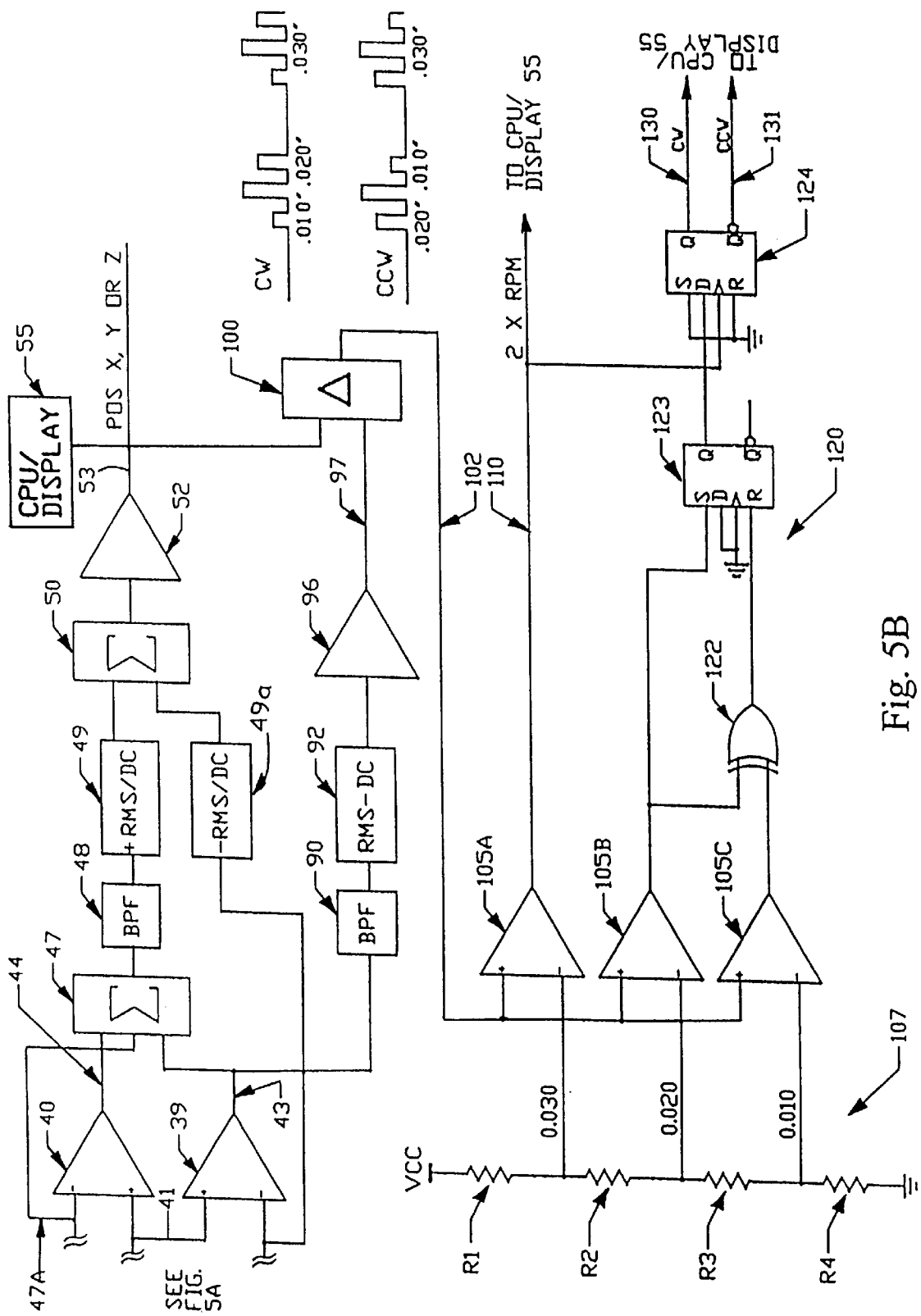
Figure 5C:
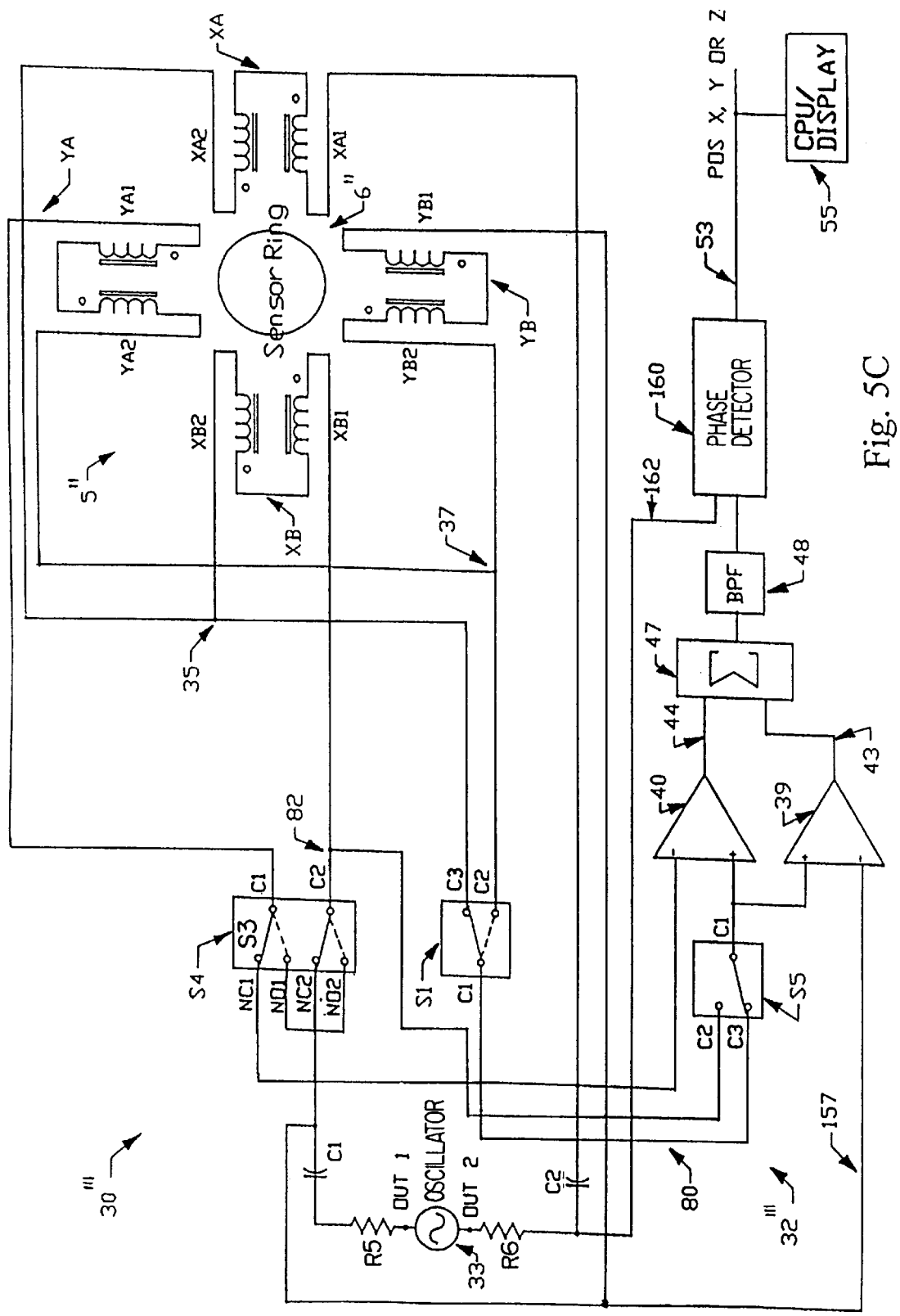
FIG. 5C is a schematic diagram of the embodiment of FIG. 5A modified to provide axial and radial movement detection based on phase relationship.

FIG. 5C illustrates a modification of the system of FIG. 5A in which the phase relationship of the voltages across the coil pairs are analyzed in order to determine radial and axial position. As an example, the radial position of the rotor 6" using the XA and XB coil pairs is detected as follows. Specifically, with the switches in the position shown seriesconnected resistor R5 and capacitor C1 are inserted between the OUT1 terminal and the XB coil pair. Likewise, seriesconnected resistor R6 and capacitor C2 are inserted between the OUT2 terminal and the XA coil pair. The resistors R5 and R6 are each reference resistors selected to provide a fixed resistance. The capacitors C1 and C2 are selected such that the capacitors provide a capacitive reactance equal to the inductive reactance of the XB and XA coil pairs, respectively, at the driving frequency of the source 33 and when the rotor assembly 6" is centered (e.g., X=0). The voltage at the node between capacitor C1 and the XB coil pair is coupled to the inverting input of operational amplifier 39 via line 157. The voltage at the node between capacitor C2 and the XA coil pair is coupled to the inverting input of operational amplifier 40 as is shown.

The outputs of the amplifiers 39 and 40 are added together by the summing circuit 47 and the summation is filtered through bandpass filter 48. In this embodiment, however, the output of the bandpass filter serves as the input to a phase detector 160. The phase detector 160 compares the difference in phase between the output of the filter 48 and a reference signal provided via line 162 from the node between capacitor C2 and the XB coil pair. The output of the phase detector 160 on line 53 is indicative of the direction and extent of movement of the rotor assembly 6". As the rotor assembly 6" moves in the +X direction, for example, the inductive reactance of the XA and XB coils will change relative to the capacitive reactance of the capacitors C1 and C2 and the output of the phase detector 160 will reflect a positive phase change between the output of the filter 48 and the reference on line 162. The magnitude of the phase change is substantially linearly related to the degree of movement. If the rotor assembly 6" moves in the −X direction, the output of the phase detector 160 will reflect a negative phase change. The output of the phase detector 160 is provided to the CPU/display 55 as in the above examples for further processing, control, display, etc.

In order to measure radial movement in the Y direction, switch S1 is simply moved to the position shown in phantom so as to substitute the YA and YB coil pairs in place of the XA and XB coil pairs. Again, the output of the phase detector 160 will provide both direction and magnitude information indicative of radial movement in the Y direction. Axial movement is detected by positioning switch S5 such that contact C1 is connected to contact C2 as shown in phantom. In addition, switch S4 is positioned such that contacts C1 and C2 are connected to contacts NO1 and NO2, respectively, as shown in phantom. As a result, the phase detector 160 will detect the relative phase change between the X coils and the Y coils and produce an output indicative of the direction and magnitude of axial movement. Note that any common mode noise will again cancel out resulting in common mode noise reduction in the present embodiment also.

The phase detector 160 could be an analog device, such as a commercially available phase locked loop (PLL), or the time difference between the reactive waveforms and the source 33 could be directly converted to a digital value using a high frequency digital source (e.g., 1 MHz) and digital counter to count the time period in between. The resistors R5 and R6 can be discrete components or can be represented by the resistance which is inherent in each of the coil pairs in actual practice. A significant advantage offered by the phase based approach of FIG. 5C versus the amplitude based approach of FIG. 5A, for example, is that the system is less susceptable to amplitude noise. It will be appreciated that the phase based approach of FIG. 5C can be used in place of the amplitude based approach in each of the embodiments discussed herein, without departing from the scope of the invention.

FIGS. 6A and 6B represent a variation of the principle described in connection with the rotor assembly of FIGS. 4A and 4B. Instead of changing the effective gap by introducing tapered surfaces 70a and 70b, two materials designated U and V are used to change the effective $\mu_r$ relationship, and therefore the inductance, as a change in axial position is introduced. The rotor assembly 6''' in this embodiment includes separate rotor lamination stacks 12Y and 12X separated by material U, and material V is located on the outer sides of the rotor lamination stacks 12Y and 12X. Preferably, in the center position (i.e., Z=0) the rotor lamination stacks 12Y and 12X are aligned with the corresponding stator lamination stacks 16Y and 16X, as shown. The rotor lamination stacks 12Y and 12X preferably have the same axial length as the corresponding stator lamination stacks 16Y and 16X.

The reluctance path of equation [4] is rewritten to include the changes do to the differing parameters associated with this adaptation. For the sake of simplicity, only the mathematical theory behind the YA coil pair will be identified, realizing that similar properties can be shown for the YB, XA and XB coil pairs.

$$\Re_{YA}=(I_{is}/(\mu_r\mu_oA))+(1/((\mu_r\mu_oA_r/I_{ir})+(\mu_{ru}\mu_oA_u/I_{iu})+(\mu_{rv}\mu_oA_v/I_{iv})))+(2g_{YA}/\mu_oA) \quad [6]$$

where $I_{is}$=Length of the stator lamination path $I_{ir}$=Length of the rotor lamination path $I_{iu}$=Length of the Material U path $I_{iv}$=Length of the Material V path $\mu_r$=relative permeability of the stator and rotor material $\mu_{ru}$=relative permeability of Material U $\mu_{rv}$=relative permeability of Material V A=Area across the stator core and the gap $A_r$=Rotor area intersected by the stator core $A_u$=Rotor area intersected by Material U $A_v$=Rotor area intersected by Material V.

Substituting $\Re_{YA}$ in equation [1] yields $L_{YA}=N^2/\Re_{YA}$. Similar substitutions can also be made for $L_{YB}$, $L_{XA}$ and $L_{XB}$. Therefore, the total inductance of the coil axis pairs in FIGS. 6A and 6B is $L_{YT}=(N^2/\Re_{YA})+(N^2/\Re_{YB})$ $L_{XT}=(N^2/\Re_{XA})+(N^2/\Re_{XB})$.

An important parameter in this embodiment is that $\mu_{ru}$ and $\mu_{rv}$ should be selected to be significantly different, such as a factor of 2 or greater, than $\mu_r$. Also, one of the two materials should have greater magnetic properties, and one should have less. For example, $\mu_{rv}$=8000, $\mu_r$=4000, and $\mu_{ru}$=1 (air), or vica versa. The larger the differential between the material properties, the greater the sensitivity of this effect.

This effect is again non-linear due to the flux lines wanting to take the path of least magnetic resistance ($\Re$). Materials U, V and the rotor lamination material could be judicially selected such that an approximate linear relationship could be achieved. For example, each of the rotor lamination stacks 12Y and 12X could physically extend into the U and V areas, i.e., there would be no clear delineation of where the different materials began or ended. It will also be appreciated that multiple $\mu_r$ laminate materials could be selected for the different rotor materials to give the desired combined p, properties. Each of these rotor laminates could be selected to have either progressive or regressive $\mu_r$ properties. Therefore, a more linear axial to inductive relationship could be realized by selecting each laminate of the rotor lamination stack 12Y to have continually progressive $\mu_r$ values. The inverse of this material stacking relationship could then be applied to the rotor lamination stack 12X. The more linear the change of $\mu_r$ values, the more linear the inductive relationship would become. In reality, only several material changes would be needed to improve this non-linear relationship such that in a system such as that shown in FIG. 5A, an electronic multiplier, computer algorithm, etc., alone or combined with a different geometric configuration and/or materials such as the taper described above, could be used to realize the desired degree of linearity and sensitivity. Therefore, axial movement will produce a total inductance change in both $L_{YT}$ or $L_{XT}$, and this inductance change will produce a signed (– or +) voltage output on line 53 indicative of axial position.

FIGS. 7A–7B illustrate another embodiment of a sensor and rotor assembly similar to the arrangement shown in FIGS. 4A and 4B. The sensor assembly 5'' is identical in both embodiments; however four axial flats are impressed on each of the rotor lamination stacks 12Y and 12X in the rotor assembly 6''''. These flats enable the monitoring system of the present invention to detect direction and speed of rotation of the shaft 7 as will now be described. Specifically, rotor lamination stack 12Y includes two pairs of flats Y1 and Y2. Rotor lamination stack 12X includes two pairs of flats X1 and X2. Similar flats (e.g., X1,X1; X2,X2, etc.) on each rotor lamination stack are positioned 180° apart. At the same time, dissimilar flats (e.g., X1, X2; Y1, Y2) are angularly spaced to intersect the centerline to centerline spacing between the coils on the respective stator lamination stack as shown in FIG. 7B. The rotor lamination stacks 16X and 16Y are offset 90° relative to one another so as to correspond with the offset between the XA,XB coils pairs and the YA,YB coil pairs. This assures that both $L_{YT}$ or $L_{XT}$ will be simultaneously and equally effected by the rotor flats.

As a result of such construction, there are four different possible alignments which can occur during the rotation of the rotor lamination stack relative to the corresponding stator lamination stack. For example, when considering the alignment of the rotor lamination stack 12Y relative to the stator lamination stack 16Y there are the following possibilities:

(1) Flats Y1 are aligned with coils YB2 and YA1, respectively; and flats Y2 are aligned with coils YB1 and YA2, respectively;

(2) Flats Y1 are aligned with coils YB1 and YA2, respectively; and flats Y2 are not aligned with any coils;

(3) Flats Y2 are aligned with coils YB2 and YA1, respectively; and flats Y1 are not aligned with any coils; or (4) Neither flats Y1 or Y2 are aligned with any coils.

Similar alignments apply with respect to the flats on rotor lamination stack 12X and stator lamination stack 16X.

According to the preferred embodiment, flats Y1 and X1 are chords of known radial depth, such as 0.010 inch relative to the axis of rotation A1, and flats Y2 and X2 are flats of another known depth, such as 0.020 inch. These flats are operative to change the effective gap between the coils and the corresponding rotor lamination stack. For example, depending on which alignment (1)–(4) discussed above is applicable at a given time during the rotation of rotor assembly 6'''', the effective difference in the gap presented to the flux path through this coil pair will vary sequentially between 0.0, 0.010, 0.030, and 0.020 inch. Therefore, for example, if only flats Y1 are positioned under coils YA2 and YB1, respectively, then the average gap for the YA coils is decreased by 0.005 inch and therefore $L_{YA}$ is diminished in accordance with equation [4]. A similar and simultaneous decrease in the value for $L_{YB}$ would also be realized. Therefore, the value for $L_{YT}$ would be diminished in accordance with an effective gap change of 0.010 inch. A similar argument and simultaneous change in $L_{XT}$ would also occur. When flats Y1,X1 and Y2,X2 are all aligned with the respective coils, then the LET and $L_{XT}$ values would decrease by 0.030". When only flats Y2,X2 are aligned with the respective coils, then the $L_{YT}$ and $L_{XT}$ value would decrease by 0.020".

As is discussed below, the system according to the present invention utilizes an electronic comparator circuit to detect variations in inductance due to changes in the effective gap as a result of the flats in order to determine speed and direction of rotation. FIG. 5B is a schematic diagram of the additional circuitry which is combined with the circuit of FIG. 5A in order to detect speed and direction of rotation. In this example, the rotor assembly 6"" of FIGS. 7A and 7B is substituted for the rotor assembly 6" originally discussed above with respect to FIG. 5A. For ease of understanding, FIG. 5B also includes a number of the components shown in FIG. 5A (beginning primarily with the inputs to the operational amplifiers 39 and 40). For reasons stated below, the system represented by FIGS. 5A and 5B can be used to detect the radial and axial position of the rotor assembly 6"" in the same manner previously discussed. Therefore, only the differences in the system 30" which relate to the detection of speed and direction of rotation will be discussed in detail.

Specifically, the output of amplifier 39 is also coupled to a bandpass filter 90 which serves to filter the amplifier output. An RMS-DC voltage converter 92 provides as its output the average DC voltage output from the filter 90. The output from the detector 92 is filtered through a lowpass filter 94 and is amplified by amplifier 96. When switch S4 (FIG. 5A) is positioned such that contacts C1 and C2 are connected together via contacts NO1 and NO2, and switch S5 is positioned such that contact C1 is connected to contact C2, the output of the amplifier 96 on line 97 represents the voltage across the series-connected YA and YB coil pairs.

The voltage across the YA and YB coil pairs will vary with time as a function of the flats Y1 and Y2 rotating through the various alignments with respect to the coils YA1, YA2, YB1 and YB2. For the reasons described above, the average gap change as the rotor assembly 6"" rotates will be either 0.0, 0.010, 0.020, or 0.030 inch depending on the location of the flats relative to each coil pair, thus causing a corresponding change in the inductance and voltage across the coils. The peak in the absolute value on line 97 will occur when the center of all of the flats bisects the center of their respective coils (i.e., all the flats are aligned). The same is true with respect to the flats on the rotor lamination stack 12X in relation to the X coils.

Accordingly, the output of the amplifier 96 will be representative of location of the flat pairs Y1, Y2 relative to the YA and YB coil pairs. Note, however, that the effect of the opposing flat pairs Y1, Y2 and X1, X2 does not affect the radial or axial movement detection schemes previously discussed in the output of amplifier 52. The output of amplifier 52 therefore serves as a reference voltage which is input to a comparator circuit 100. The output of amplifier 96 is also input to the comparator circuit 100. The comparator circuit 100 compares the signal on line 97 to the reference voltage provided on line 53. The comparator circuit 100 is designed to output on line 102 a voltage pulse each time the difference between the signals on lines 97 and 53 vary by an amount equivalent to a change in the average effective gap of either 0.010, 0.020, or 0.030 inch for reasons previously described. The amplitude of each pulse is selected to be proportional to the change in the average effective gap as shown in FIG. 5B. The design and construction of such a comparator circuit 100 will be readily apparent to someone having ordinary skill in view of the present disclosure. Therefore, further details are omitted.

The comparator circuit output on line 102 is connected to the non-inverting inputs of comparators 105A–105C. Resistors R1–R4 are connected in series between a DC power supply voltage Vcc and ground to form a voltage divider network 107. The nodes between resistors R1 and R2, R2 and R3, and R3 and R4 are respectively connected to the inverting inputs of the comparator 105A–105C. The values of the resistors R1–R4 are selected such that when the pulse on line 102 is representative of a gap change of 0.030 inch, the outputs of all the comparators 105A–105C will go from a logic "low" level to a logic "high" level; when the pulse on line 102 is representative of a gap change of 0.020 inch, only the outputs of comparators 105B and 105C will go from a logic "low" to a logic "high"; and when the pulse on line 102 is representative of a gap change of 0.010 inch, only the output of comparator 105C will go from a logic "low" to a logic "high".

As the rotor assembly 6"" rotates, each coil pair YA and YB will encounter a pair of flats Y1,Y2 twice for each revolution. Thus, a pulse corresponding to a gap change of 0.030 inch will occur twice per revolution. As a result, the output from comparator 105A on line 110 will be a pulse signal having a frequency which is twice the rate of revolution of the rotor assembly 6"". The output on line 110 is provided to the CPU/display 55 and can be processed to give an indication of speed of rotation using conventional means.

Considering that the analyzing circuits 32 and 32" of FIGS. 2A and 5A, respectively, detect radial movement by comparing the differential between the inductances of the coils, it can be shown that the flats have very little effect on the radial detection schemes described in therein. It can also be shown that the methods for determining axial position described herein with respect to FIGS. 2A and 5A would also be unaffected by the configuration of FIGS. 7A–7C. As a result, the sensor and rotor assembly of FIGS. 7A–7C can be utilized in the same manner to detect radial and axial movement while still providing common mode noise reduction.

Furthermore, the direction of rotation of the rotor assembly 6"" can also be ascertained using the flats according to the present invention. When determining direction of rotation, the positions of switches S4 and S5 in FIG. 5A are the same as in the above-described case where speed of rotation is measured. As shown in FIG. 7B, the flats X1,X2 and Y1,Y2 are alternately positioned on the respective rotor lamination stacks 12X and 12Y. Therefore, depending on the direction of rotation of the rotor assembly 6"" the output of the comparator circuit 100 will be a time sequence of pulses the order of which identifies the direction of rotation. More specifically, if the rotor assembly 6"" was rotating counter clockwise (CCW), for example, the output of the comparator circuit 100 would be a time-ordered sequence of pulses corresponding to effective average gap changes of 0.020, 0.030, and 0.010 inch which is repeated in that order. Similarly, if the rotor assembly 6"" was rotating clockwise, the output of the comparator circuit 100 would be a time-ordered sequence of pulses corresponding to effective average gap changes of 0.010, 0.030, and 0.020 inch which is repeated in that order.

The pulses provided from the comparator circuit 100 on line 102 cause the outputs of the comparators 105A–105C to trip from a logic "low" to a logic "high" in sync with the corresponding pulses. A detector circuit 120 coupled to the outputs of the comparators 105A–105C detects the order of the sequence of pulses provided on line 102 in order to ascertain the direction of rotation. Specifically, the detector circuit 120 includes an exclusive-OR gate 122, set-reset (SR) flip-flop 123 and data (D) flip-flop 124. The outputs of comparators 105B and 105C are connected to respective inputs of XOR gate 122. As a result, the output of XOR gate 122 is a logic "1" only when a pulse corresponding to an average gap change of 0.010 inch is present on line 102. The output of XOR gate 122 is connected to the reset input of the SR flip-flop 123. At the same time, the output of comparator 105B is connected to the set input of SR flip-flop 123. Thus, a pulse on line 102 corresponding to an average gap change of 0.020 will set the Q output of SR flip-flop 123 to a logic "1". A pulse on line 102 corresponding to an average gap change of 0.010, on the other hand, will reset the Q output of SR flip-flop 123 to a logic "0".

The Q output of SR flip-flop 123 is connected to the D input of D flip-flop 124, and the output of comparator 105A serves as the clock to the D flip-flop 124. If the rotor assembly 6"" is rotating clockwise (CW), the time sequence of the pulses on line 102 correspond to 0.010, 0.030, and 0.020 inch, in that order as mentioned above. The occurrence of the 0.010 pulse will reset the Q output of SR flip-flop 123 to a logic "0" only during the 0.010 pulse. The occurrence of the following 0.030 pulse will result in a clocking of the logic "0" at the Q output from the SR flip-flop 123 causing the Q output of the D flip-flop 124 to assume a logic "0" level on line 130 and the Q-bar output to assume a logic "1" level on line 131. After the 0.030 pulse, the 0.020 pulse will set the SR flip-flop 123 causing the Q output of the SR flip-flop 123 to assume a logic "1" level. However, the D flip-flop 124 cannot change state until the next 0.030 pulse and therefore the Q and Q-bar outputs remain at a logic "0" and "1" level, respectively, indicating CW rotation.

The time ordered sequence of pulses corresponding to 0.010, 0.030, 0.020 inch continues to repeat on line 102 as the rotor assembly 6"" continues to rotate clockwise, and as a result, the Q and Q-bar outputs of D flip-flop 124 remain at a logic "0" and "1" levels, respectively, thus indicating clockwise rotation. The outputs of the D flip-flop 124 are coupled to the CPU and/or display 55 to provide an indication of clockwise rotation.

If the rotor assembly 6"" is rotating counter-clockwise (CCW), on the other hand, the time sequence of pulses on line 102 correspond to 0.020, 0.030, 0.010 inch, in that order as mentioned above. The occurrence of the 0.020 pulse will cause the output of comparator 105B to go high resulting in the setting of the SR flip-flop 123, thus assuming a logic "1" level at its Q output. The occurrence of the 0.030 pulse will result in a clocking of the logic "1" from the Q output of the SR flip-flop 123 causing the Q output of the D flip-flop 124 to assume a logic "1" level on line 130 and the Q-bar output to assume a logic "0" level on line 131. Next, with the occurrence of the 0.010 pulse on line 102 the Q output of SR flip-flop is reset to a logic "0", however, the D flip-flop 124 does not change state and therefore the Q and Q-bar outputs remain at a logic "1" and "0" level, respectively, indicating CCW rotation.

The time ordered sequence of pulses corresponding to 0.020, 0.030, 0.010 inch continues to repeat on line 102 as the rotor assembly 6"" continues to rotate counter-clockwise, and as a result, the Q and Q-bar outputs of D flip-flop 124 remain at a logic "1" and "0" levels, respectively, thus indicating clockwise rotation. The outputs of the D flip-flop 124 are coupled to the CPU and/or display 55 to provide an indication of counter-clockwise rotation.

It will be appreciated that although flats are used in the preferred embodiment to depict a physical rotating property on the rotor assembly, there are several other alternatives for effecting the differing values in the effective gap change. For example, the rotor assembly 6"" may include in place of the flats sets of grooves, slots or inserted materials with differing widths or material properties which would effectuate the same results for both the speed and direction of rotation detection. Each of these different techniques, and any equivalents thereof, are considered to be within the scope of the invention.

Figure 8:
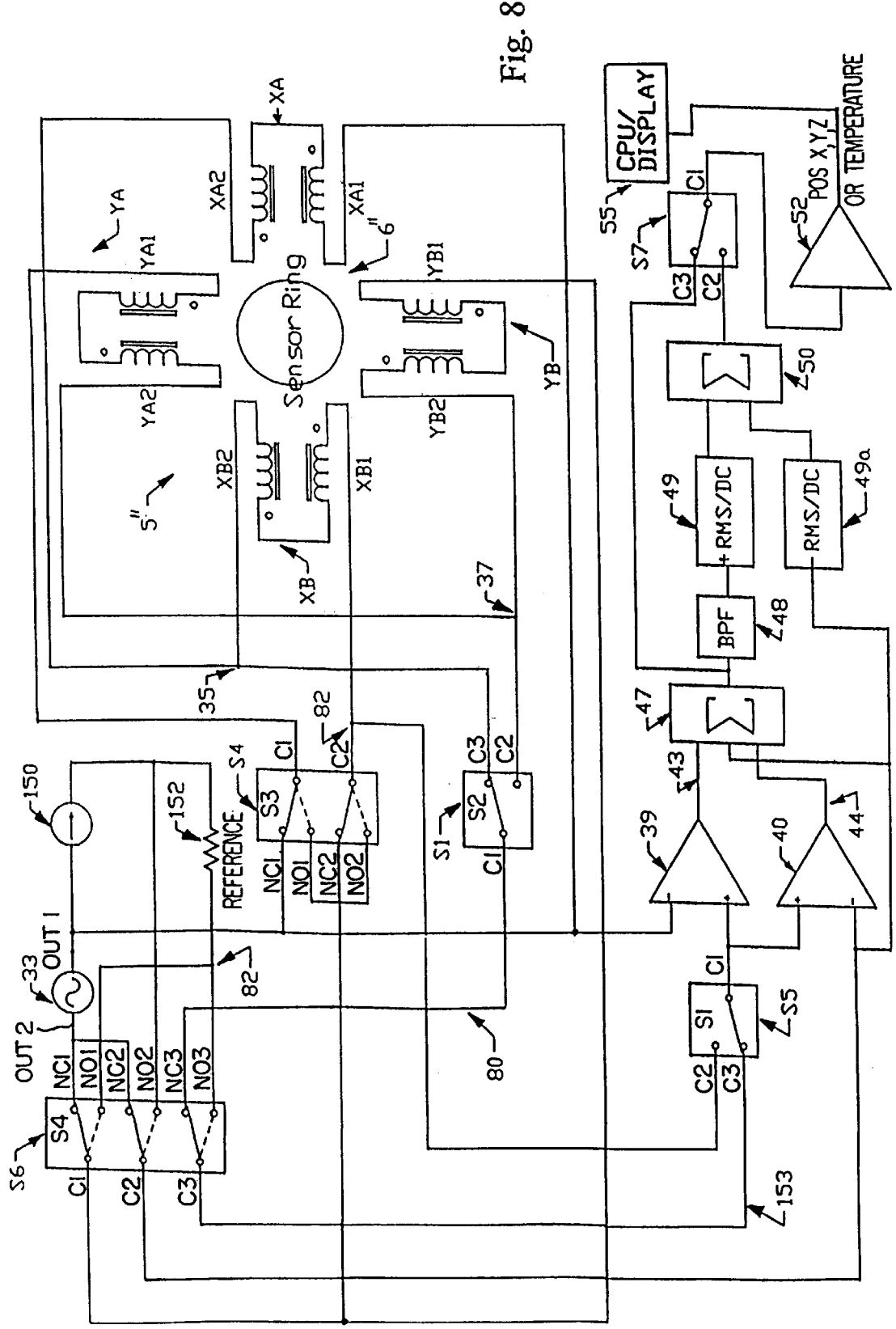
FIG. 8 is a schematic diagram of a fourth embodiment of the present invention for detecting operating temperature in addition to radial and axial movement.

Turning now to FIG. 8, still another embodiment of the monitoring system is shown according to the present invention. The system and its operation in relation to detecting axial and radial position is the same as described above in connection with FIG. 5A. Therefore, the operation of the system with respect to detecting axial and radial position will not be repeated.

However, the system further includes means for ascertaining the operating temperature of the system. The system includes switch S6 which functions to disconnect the power source 33 from the circuit and connect a constant current source 150 and temperature stable resistor 152 into the circuit. In addition, the system includes switch S7 which selectively couples the output of the summing circuit 47 directly to the input of the amplifier 52. Specifically, when switches S6 and S4 are placed in the positions shown in phantom and switch S5 remains in the original position shown, coil pairs XA, XB, YA and YB are all connected in series. The series-connected coil pairs are then connected in series to the reference resistor 152 at node 82 to form a voltage divider circuit across the terminals of the current source 150.

The voltage at node 82 is input to the non-inverting inputs of operational amplifiers 39 and 40 via line 153. The output of operational amplifier 40 represents the voltage across the reference resistor 152, and the output of operational amplifier 39 represents the voltage across coil pairs XA, XB, YA and YB, as will be appreciated. The outputs on lines 43 and 44 are added together with the reference signal on line 47a and therefore are effectively compared by the summing circuit 47, with the output of the summing circuit 47 representing the difference between the voltage across the coil pairs and the voltage across the reference resistor 152. This signal is coupled directly to the input of amplifier 52 to provide an output signal to the CPU and/or display 55.

It will be appreciated that the resistance of a wire making up any one of the coils in the inductive sensors varies directly with the temperature surrounding it. This well known property is stated $$t_2 = ((R_2 \times (t_{abe} + t_1))/R_1) - t_{abe}, \qquad [7]$$

where $t_{abe}$=Inferred absolute material temperature (Cu=234.5° C.)

$t_1$=Temperature at state 1 (typically room temperature)

$t_2$=Unknown temperature $R_1$=Resistance at $t_1$ $R_2$=Resistance at $t_2$

Therefore, comparing the change in voltage across the coil pairs XA,XB,YA,YB (which is indicative of a change in resistance) to the voltage across the reference resistor 152 (which is indicative of a constant resistance) will produce a voltage at the output of amplifier 52 which is indicative of the total resistance or average coil temperature. The average coil temperature is, of course, related to the environment in which the coils reside. As a result, the output of the amplifier 52 is indicative of the operating environment of the coils. Preferably, the resistance value of resistor 152 is selected so that the combined inductive resistances, $R_{LX}+R_{LY}$ of the coil pairs, would equal some convenient temperature value such as 27° C. Temperature stable resistor 152 could be oven stabilized, or it could be made up of two resistances that had equal, but opposite, temperature characteristics. These temperature characteristics are material related and are referred to as the Negative Temperature Coefficient (NTC), and the Positive Temperature Coefficient (PTC) of these special resistive devices.

Figure 9:
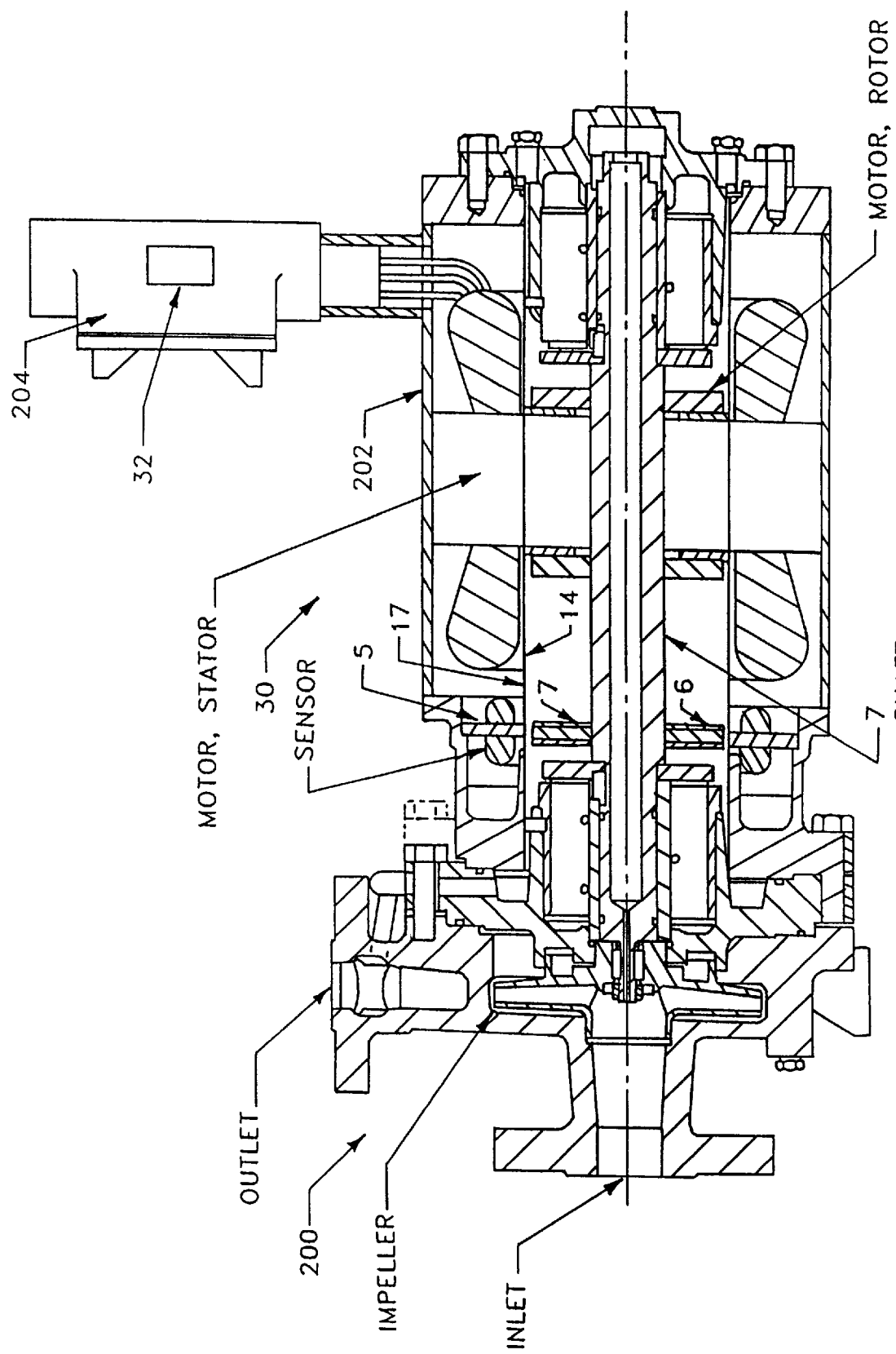
FIG. 9 is a cross-section view of a canned motor pump including a monitoring system in accordance with the present invention.

FIG. 9 illustrates the monitoring system 30 of the present invention utilized in a canned motor pump 200. The sensor assembly 5 and rotor assembly 6 are enclosed in the rotor can 14 and stator can 17, respectively. Wiring from the coils in the stator assembly 5 is enclosed in the stator housing 202 and connects the coils to the analyzing circuit 32 in a control panel 204. A monitoring system 30 according to the different embodiments described herein is capable of detecting the position of the shaft within a few thousandths of an inch. Moreover, because both the rotor assembly 6 and the stator assembly can be enclosed separately in their own respective cans, the monitoring system 30 remains unaffected by the fluid environment. Also, the monitoring system 30 does not require penetration of either the stator or rotor cans.

Figure 10:
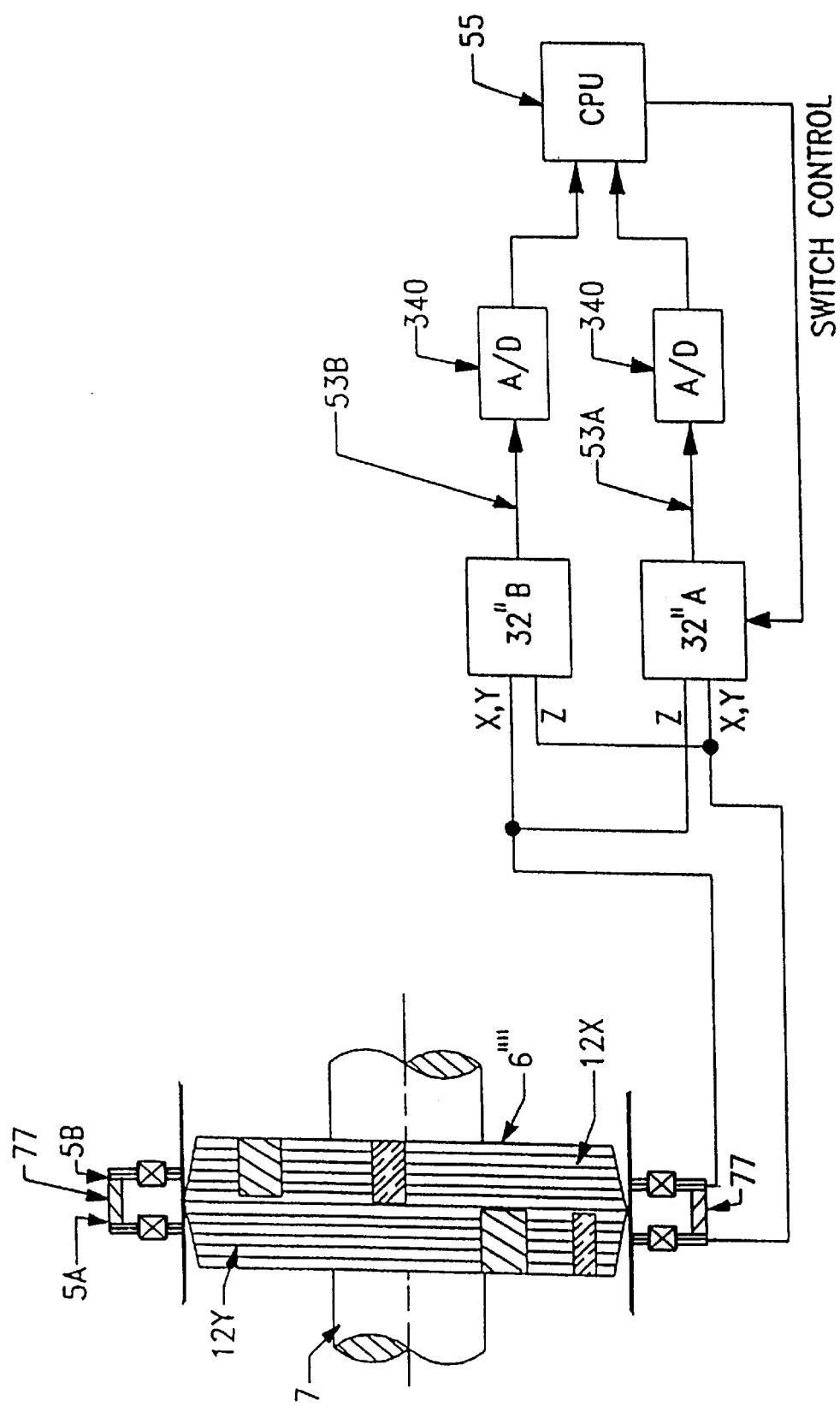
FIG. 10 is a schematic diagram of a fifth embodiment of the present invention for detecting abnormalities using redundant sensors.

Referring now to FIG. 10, another embodiment of the present invention is shown in which redundant sensors are utilized to detect non-uniformities or abnormalities in the rotating shaft 7 and to increase sensitivity. The embodiment of FIG. 10 includes a pair of inductive sensor assemblies 5A and 5B which are each identical to the inductive sensor assembly 5 shown in FIG. 1B. Specifically, the sensor assemblies 5A and 5B each include XA, XB, YA and YB coil pairs. The sensor assemblies 5A and 5B are spaced apart by a spacer 77 as in the embodiment of FIG. 7A, for example. The sensor assemblies 5A and 5B are positioned proximate rotor lamination stacks 12Y and 12X of rotor assembly 6"" which is identical to the rotor assembly of FIG. 7A for example.

The XA, XB, YA and YB coil pairs for each inductive sensor 5A and 58 are connected to analyzing circuits 32"A and 32'B, respectively, which are each identical to the analyzing circuit 32" shown in FIGS. 5A and 5B, for example. In particular, the XA, XB, YA and YB coil pairs of the inductive sensor 5A are connected to the analyzing circuit 32"A in order to produce an output on line 53A which is indicative of the X and Y position of the rotor laminations stack 12Y using the principles described above. Similarly, the XA, XB, YA and YB coil pairs of the inductive sensor 5B are connected to the analyzing circuit 32"B in order to produce an output on line 53B which is indicative of the X and Y position of the rotor laminations stack 12X. Furthermore, switching means (not shown) allow the XA and XB coil pairs of each of the sensor assemblies to be selectively connected to the analyzing circuit 32" corresponding to the other sensor assembly so that axial movement alono the Z-axis can be detected by each analyzing circuit 32" in the same manner described above. For example, the output of the YA and YB coil pairs of the sensor assembly 5A is analyzed by the analyzing circuit 32"A in combination with the output of the XA and XB coil pairs of the sensor assembly 5B in order to provide an output on line 53A indicative of axial movement of the rotor assembly 6"". Control of such switching means is provided via the CPU 55.

The output signals on lines 53A and 53B are digitized by respective analog-to-digital converters 340 and the data is input to the CPU 55. The CPU 55 is programmed to monitor simultaneously the outputs from both the analyzing circuits 32"A and 32"B. By analyzing the differential between the outputs non-uniformities or other physical abnormalities in the rotation of the shaft can be detected. For example, if the shaft 7 was bent the position of the rotor assembly 6"" would be different relative to the two inductive sensors 5A and 5B. By comparing the outputs provided on lines 53A and 53B for the X, Y and Z positions, non-uniformities can be detected as will be appreciated. Furthermore, by using redundant sensor assemblies the overall sensitivity of the system is increased. It will also be appreciated that more than two sensor assemblies could be used to increase even further the redundancy of the system to provide even more information to the CPU 55.

Although the invention has been shown and described with respect to certain preferred embodiments, it is obvious that equivalents and modifications will occur to others skilled in the art upon the reading and understanding of the specification. For example, the monitoring system as described uses using rotor laminations having the desired magnetic permeability characteristics. However, there are many other ways for providing the desired characteristics such as material inserts which are placed in a groove around the circumference of the rotor assembly 6.

Moreover, although the invention is discussed in some embodiments as using a rotor assembly 6 having tapers to result in a variation in the effective gap due to axial movement, the same results may be obtained by using a rotor assembly material which has a magnetic permeability which varies in the axial direction according to a known function. Similarly, although the use of straight tapers is described in the preferred embodiment, other embodiments can make use of compound curves or the like without departing from the scope of the invention. Furthermore, although the sensor ring is described as including eight coils it will be appreciated that some other number can be used without departing from the scope of the invention. It will also be appreciated that the various embodiments and inventive features described herein can be combined in a variety of ways. The particular examples described herein are illustrative of the invention but are not intended to be limiting in any manner. In addition, the different embodiments have been described as including various types of switches. Such switching can be carried out by mechanical switches or any other type of switching means for achieving the same result.

In addition, the invention is described primarily in the context of its use in a canned motor pump. However, the present invention has utility as a means for detecting the radial and axial position of any body that is positioned or rotates about an axis.

The present invention includes all such equivalents and modifications, and is limited only by the scope of the following claims.

What is claimed is:

1. A system for sensing a position of a body rotating about an axis, said system comprising:
   at least one inductive sensor positioned in proximity to said body, each of said at least one inductive sensor providing an output;
   at least one bearing which facilitates the rotation of said body about said axis;
   means forming part of said body for effecting a variation in the output of said at least one inductive sensor as a function of axial movement and radial movement of said body relative to said axis; and means for analyzing the output of said at least one inductive sensor to produce a system output which is indicative of said axial movement and said radial movement and is independent of a rotational position and frequency of said body about said axis.

2. The system of claim 1, wherein said system includes a plurality of said inductive sensors positioned in a plane normal to said axis.

3. The system of claim 1, wherein said means for effecting includes material proximate said at least one inductive sensor and having a magnetic permeability operative to result said variation.

4. The system of claim 3, wherein said system includes a plurality of said inductive sensors positioned in a plane normal to said axis, and said material includes a first material having a relatively high magnetic permeability and is positioned generally in said plane between second materials having a relatively low magnetic permeability.

5. The system of claim 1, said analyzing means comprising means, governed by said means for effecting, for ascertaining a direction of said axial movement.

6. The system of claim 5, wherein said means for effecting includes a surface on said body proximate said at least one inductive sensor, said surface being tapered relative to said axis.

7. The system of claim 1, said system including a plurality of said inductive sensors, and said means for analyzing further comprising means, governed by said means for effecting, for reducing common mode noise induced in said inductive sensors.

8. The system of claim 7, wherein said means for effecting includes a pair of surfaces each proximate a corresponding one of said inductive sensors, each of said surfaces being tapered in different directions relative to said axis, and said means for reducing comprises means for subtracting the output from one of said corresponding inductive sensors from the other of said corresponding inductive sensor to effect said common mode noise reduction.

9. The system of claim 8, said system including a plurality of said inductive sensors, and said means for evaluating comprising means, governed by said means for effecting, for reducing common mode noise induced in said inductive sensors.

10. The system of claim 1, said means for effecting further including means to effect a variation in the output of said at least one inductive sensor as a function of a rotational speed of said body, and said system further including means for evaluating the output of said at least one inductive sensor to produce an output indicative of said rotational speed.

11. The system of claim 1, said means for effecting further including means to effect a variation in the output of said at least one inductive sensor as a function of a direction of rotation of said body, and said system further including means for evaluating the output of said at least one inductive sensor to produce an output indicative of said direction of rotation.

12. The system of claim 1, said at least one inductive sensor including a coil, and further comprising means for ascertaining an operating temperature characteristic of said coil.

13. A monitoring system for an electromechanical device including a stator and a rotor which rotates about an axias, comprising:

at least one bearing which facilitates the rotation of aid rotor about said axis;

at least one inductive sensor included as part of said stator and positioned in proximity to said rotor, each of said at least one inductive sensor providing an output;

means forming part of said rotor for effecting a variation in the output of said at least one inductive sensor as a function of axial movement and radial movement of said rotor relative to said axis; and means for analyzing the output of said at least one sensor to produce a system output which is indicative of said axial movement and said radial movement and is independent of a rotational position and frequency of said body about said axis.

14. The system of claim 13, wherein said system includes a plurality of said inductive sensors positioned on a ring shaped stator assembly, said assembly being centered about said axis and positioned in a plane normal to said axis.

15. The system of claim 13, wherein said system includes a pair of ring shaped stator assemblies and a plurality of said inductive sensors positioned on each of said assemblies, said assemblies being centered about said axis and positioned in respective planes normal to said axis.

16. The system of claim 15, said means for analyzing comprising means for performing common mode noise cancellation between the outputs of said inductive sensors on one of said assemblies and the outputs of said inductive sensors on the other of said assemblies.

17. The system of claim 13, wherein said means for effecting includes material around the circumference of said rotor and having a magnetic permeability operative to result said variation.

18. The system of claim 13, said analyzing means comprising means, governed by said means for effecting, for ascertaining a direction of said axial movement.

19. The system of claim 13, wherein said means for effecting includes a surface on said rotor proximate said at least one inductive sensor, said surface being tapered relative to said axis.

20. The system of claim 13, wherein said system includes a pair of said inductive sensors offset from each other relative to said axis, and said means for effecting includes a pair of surfaces on said rotor each proximate a corresponding one of said pair of inductive sensors, each of said surfaces being tapered in different directions relative to said axis, and said means for reducing comprises means for subtracting the output from one of said corresponding inductive sensors from the other of said corresponding inductive sensor to effect said common mode noise reduction.

21. The system of claim 13, said means for effecting further including means to effect a variation in the output of said at least one inductive sensor as a function of a rotational speed of said rotor, and said system further including means for evaluating the output of said at least one inductive sensor to produce an output indicative of said rotational speed.

22. The system of claim 13, said means for effecting further including means to effect a variation in the output of said at least one inductive sensor as a function of a direction of rotation of said rotor, and said system further including means for evaluating the output of said at least one inductive sensor to produce an output indicative of said direction of rotation.

23. The system of claim 13, said at least one inductive sensor including a coil, and further comprising means for ascertaining an environmental operating temperature characteristic of said coil.

24. The system of claim 13, further comprising a rotor can which encloses said rotor and said means for effecting relative to said at least one inductive sensor.

25. The system of claim 13, wherein said system includes a pair of said inductive sensors offset from each other relative to said axis, and said means for effecting includes a pair of surfaces on said rotor each proximate a corresponding one of said pair of inductive sensors, each of said surfaces being tapered in different directions relative to said axis, and said means for reducing comprises means for subtracting the output from one of said corresponding inductive sensors from the other of said corresponding inductive sensor to effect said common mode noise reduction and to effect increased sensitivity.

26. The system of claim 13, said means for analyzing comprising means for evaluating the phase of the output of said at least one sensor relative to a predetermined reference signal to produce the systems output.

27. A system for sensing a position of a body rotating about an axis substantially in real-time, comprising:

at least one bearing which facilitates the rotation of said body about said axis;

inductive sensor means positioned proximate to said body, an output of said inductive sensor means being influenced by a position of said body; and means for processing said output to provide substantially real-time axial and radial position information of said body independent of a rotational position and frequency of said body.

28. A system for sensing a position of a body rotating about an axis, comprising:

at least one bearing which facilitates the rotation of said body about said axis;

a pair of inductive sensors positioned in proximity to said body, each of said inductive sensors providing an output;

complementary inductive means forming part of said body for effecting substantially equal but opposite variations in said respective outputs as a function of axial movement of said body;

means for processing said outputs to provide an indication of the axial movement of said body and to reduce common mode noise induced in the inductive sensors.

29. The system of claim 28, wherein the complementary inductive means comprises means for varying a magnetic coupling between said complementary inductive means and the inductive sensors in a complementary manner based on the axial movement.

30. The system of claim 28 wherein the means for varying comprises a ring around said body, said ring having complementary tapers each proximate a respective one of the inductive sensors.

31. The system of claim 13, said system including a gap between said at least one inductive sensor and said means for effecting a variation, and wherein said system output is substantially unaffected by process fluid properties within the gap.

32. A system for sensing a position of a body rotating about an axis, the system comprising:

at least one bearing which facilitates the rotation of said body about said axis;

at least one inductive component positioned in proximity to the body, the at least one inductive component having an input for receiving a driving signal to produce a magnetic field proximate the body and for providing an output indicative of the magnetic field;

means forming part of the body for effecting a variation in the magnetic field produced by the inductive component as a function of axial movement and radial movement of the body relative to the axis; and means for analyzing the output of the at least one inductive component based on the variation to produce a system output indicative of the axial movement and radial movement and wherein the analyzing means is operable independent of a rotational frequency of the body.

33. The system of claim 32, wherein the at least one inductive component comprises a plurality of coils positioned around a circumference of the means forming part of the body.

* * * * *

UNITED STATES PATENT AND TRADEMARK OFFICE
CERTIFICATE OF CORRECTION

PATENT NO : 6,107,794
DATED : August 22, 2000
INVENTOR(S) : Ronald William Kipp, et al.

It is certified that error appears in the above-identified patent and that said Letters Patent are hereby corrected as shown below:

Col. 3, lines 38 to 39, delete "Fig. 7C is an enlarged view of the rotor assembly of Fig. 7B;"

Col. 9, line 48, replace "respectfully" with --respectively--.

Col. 12, line 1, replace "are" with --is--.

Col. 13, line 25, replace "do" with --due--; and line 58, replace "vica" with --vice--.

Col. 16, line 46, replace "Figs. 7A-7C" with --Figs. 7A-7B--; and line 47, replace "Figs. 7A-7C" with --Figs. 7A-7B--.

Signed and Sealed this

Twenty-fourth Day of April, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,107,794
DATED : August 22, 2000
INVENTOR(S) : Ronald William Kipp et al.

Page 1 of 1

It is certified that error appears in the above-identified patent and that said Letters Patent is hereby corrected as shown below:

Column 3,
Lines 38 to 39, delete "Fig. 7C is an enlarged view of the rotor assembly of Fig. 7B;"

Column 9,
Line 48, replace "respectfully" with -- respectively --.

Column 12,
Line 1, replace "are" with -- is --.

Column 13,
Line 25, replace "do" with -- due --; and line 58, replace "vica" with -- vice --.

Column 16,
Line 46, replace "Figs. 7A-7C" with -- Figs. 7A-7B --; and line 47, replace "Figs. 7A-7C" with -- Figs. 7A-7B --.

Signed and Sealed this

Nineteenth Day of February, 2002

Attest:

Attesting Officer

JAMES E. ROGAN
Director of the United States Patent and Trademark Office